(12) United States Patent
Cai et al.

(10) Patent No.: US 9,507,485 B2
(45) Date of Patent: Nov. 29, 2016

(54) ELECTRONIC DEVICE, DISPLAYING METHOD AND FILE SAVING METHOD

(75) Inventors: Ming Cai, Beijing (CN); Ran Sun, Beijing (CN); Geng Wang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 418 days.

(21) Appl. No.: 13/824,144

(22) PCT Filed: Sep. 27, 2011

(86) PCT No.: PCT/CN2011/080228
§ 371 (c)(1),
(2), (4) Date: Mar. 15, 2013

(87) PCT Pub. No.: WO2012/041221
PCT Pub. Date: Apr. 5, 2012

(65) Prior Publication Data
US 2013/0185673 A1    Jul. 18, 2013

(30) Foreign Application Priority Data

Sep. 27, 2010 (CN) .......................... 2010 1 0294515
Sep. 27, 2010 (CN) .......................... 2010 1 0294527
Sep. 28, 2010 (CN) .......................... 2010 1 0296032

(51) Int. Cl.
G09G 5/14       (2006.01)
G06F 3/0481    (2013.01)
G01C 21/36    (2006.01)

(52) U.S. Cl.
CPC ............. *G06F 3/0481* (2013.01); *G01C 21/36* (2013.01); *G06F 3/04815* (2013.01)

(58) Field of Classification Search
CPC ............................... G09G 5/14; G06F 3/0481
USPC .......................................................... 715/790
See application file for complete search history.

(56) References Cited

U.S. PATENT DOCUMENTS 5,553,209 A  *  9/1996  Johnson et al. .............. 345/667
6,437,777 B1    8/2002  Kamachi et al.
(Continued)

FOREIGN PATENT DOCUMENTS

CN    1479080    3/2004
CN    1559056    12/2004
(Continued)

OTHER PUBLICATIONS

Fourth Office Action dated Sep. 2, 2014 of corresponding Chinese priority application CN201010294527.1 (12 pages including English translation).
(Continued)

*Primary Examiner* — Angie Badawi
(74) *Attorney, Agent, or Firm* — Brinks Gilson & Lione; G. Peter Nichols

(57) ABSTRACT

An electronic device, a displaying method and a file saving method are described. The electronic device is in a first state and has a display area. The displaying method includes obtaining an image; obtaining an information entry; displaying the image in the display area; and displaying a first type information entry from the information entry in a first region of the display area with a first display effect, and displaying a second type information entry from the information entry in a second region of the display area with a second display effect; wherein the first type information entry is different from the second type information entry.

5 Claims, 12 Drawing Sheets

(56) References Cited

U.S. PATENT DOCUMENTS

| | | | |
|---|---|---|---|
| 7,089,113 B1 | 8/2006 | Janky et al. | |
| 7,218,319 B2 | 5/2007 | Matsumoto et al. | |
| 7,729,851 B2 | 6/2010 | Yamashita et al. | |
| 7,792,638 B2 | 9/2010 | Lee | |
| 2004/0059500 A1 | 3/2004 | Nakano | |
| 2007/0225904 A1* | 9/2007 | Pantalone et al. | 701/207 |
| 2008/0222690 A1* | 9/2008 | Kim | 725/110 |
| 2008/0252616 A1* | 10/2008 | Chen | 345/175 |
| 2009/0002335 A1* | 1/2009 | Chaudhri | 345/173 |
| 2009/0185763 A1* | 7/2009 | Park et al. | 382/311 |
| 2009/0240426 A1 | 9/2009 | Akita et al. | |
| 2011/0310087 A1* | 12/2011 | Wright et al. | 345/419 |

FOREIGN PATENT DOCUMENTS

| | | |
|---|---|---|
| CN | 1950673 | 4/2007 |
| CN | 101000372 | 7/2007 |
| CN | 101101217 | 1/2008 |
| CN | 101135565 | 3/2008 |
| CN | 101360974 | 2/2009 |
| CN | 101451852 | 6/2009 |
| CN | 101467005 | 6/2009 |
| CN | 101561290 | 10/2009 |
| CN | 101639361 | 2/2010 |
| CN | 101702165 | 5/2010 |
| CN | 101727265 | 6/2010 |
| JP | 2000-329569 | 11/2000 |
| JP | 2003-131563 | 5/2003 |
| WO | WO2009/084782 | 7/2009 |
| WO | WO2009/121299 | 10/2009 |

OTHER PUBLICATIONS

Second Office Action dated Sep. 18, 2013 of corresponding Chinese priority application CN201010294515.9 (19 pages including English translation).

First Office Action dated Oct. 30, 2012 of corresponding Chinese priority application CN201010296032.2 (16 pages including English translation).

First Office Action dated Nov. 19, 2012 of corresponding Chinese priority application CN201010294527.1 (16 pages including English translation).

First Office Action dated Jan. 14, 2013 of corresponding Chinese priority application CN201010294515.9 (22 pages including English translation).

First Office Action dated Jul. 1, 2013 of corresponding Chinese priority application CN201010296032.2 (14 pages including English translation).

Second Office Action dated Aug. 12, 2013 of corresponding Chinese priority application CN201010294527.1 (14 pages including English translation).

PCT/CN2011/080228 International Preliminary Report on Patentability dated Apr. 2, 2013 (9 pages).

PCT/CN2011/080228 International Search Report dated Dec. 15, 2011 (4 pages).

Third Office Action dated Feb. 27, 2014 of corresponding Chinese priority application CN201010294527.1 (15 pages including English translation).

Rejection Decision dated Jan. 6, 2014 of corresponding Chinese priority application CN201010296032.2 (16 pages including English translation).

Reexamination Notification for related Chinese Application No. 201010296032.2 dated Apr. 15, 2015, 15 pages.

* cited by examiner

ELECTRONIC DEVICE, DISPLAYING METHOD AND FILE SAVING METHOD

This application claims priority to International Application No. PCT/CN2011/080228 filed Sep. 27, 2011; Chinese Application No. CN201010294515.9 filed Sep. 27, 2010; Chinese Application No. CN201010294527.1 filed Sep. 27, 2010; and Chinese Application No. CN201010296032.2 filed Sep. 28, 2010, the entire contents of each are incorporated herein by reference.

The present invention relates to a field of terminal technology, particularly to a terminal and method for charging and discharging.

BACKGROUND

The present invention relates to the field of electronic device, more specially, to an electronic device, a displaying method and a file saving method.

Recently, the fast development of the Augmented Reality (AR) technology and the location-based service has brought a brand new experience to users. In the AR technology and the location-based service, a real-view interface which is a combination of a real word scenario and information entries is commonly used. The real world scenario is also called as a real-view image. The information entry corresponds to a real object. Each information entry may comprise multiple items, such as the geological location information of the real object, the type of the real object (such as a restaurant, a hospital, a school, etc.), the name of the real object, the user comment, etc. The better the fusion of the real-view image and the identifier corresponding to the information entry is, the better experience the user will get.

However, since the real-view image is a planar (2D) display of a three-dimensional (3D) scenario of the real world on the electronic device and is not real 3D, it is difficult to reflect the distance from the real object corresponding to the information entry to the user, when the 2D display is performed on the electronic device.

On the other hand, currently, in the applications based on the AR technology, the real-view image and the map image are two important views. The real-view image may be used by the user conveniently to know the surroundings, while the map image may be used by the user conveniently to know the overall situation. The user may switch between the two views frequently. In the prior art, the user need to check different views in respective different software applications, so as to compare and refer to each other. For example, the user has to view the map image in a map software, and has to view the real-view image in a real-view software. The operations are complicated. The user has to start two different applications, and has to switch manually between the two different applications when referring to each other. It is inconvenient for the user to operate and use, and is unfavorable to combine the advantages of the two views together.

Moreover, there is a navigation method in the navigation applications as the particular application, which uses the current map, and provides navigation to users by marking information entries on the map. However, such navigation method is only suitable for the user to have knowledge about the route globally. It is often difficult to find the target for various reasons when the user is already near the target location. At this time, the current navigation method is hard to function. Moreover, the current methods use languages and notations defined by human being for records, basically, and it becomes even more difficult for the user to understand in some sense, and is not intuitionistic.

SUMMARY

In view of this, the present disclosure provides an electronic device, a display method and a file saving method, which can make a better fusion of the real-view image and the information entries, so that the superimposed image of the mark of the information entry and the real-view image meets the vision theory of human being better, and the user experience is improved.

Moreover, the present disclosure provides an electronic device, a display method and a file saving method, which can switch automatically between the real-view image and the map image according to the state of the electronic device without additional keys or buttons, so that it is convenient for the user to operate and the user experience is improved, while the cost of the electronic device is saved.

Moreover, the present disclosure provides an electronic device, a display method and a file saving method, which can generate and save an image file comprising the identifier of the information entry and the image, so that the displayed image is consistent with the scenario that the user views when using the image file to navigate in a near distance, so that it is convenient for the user to use the image file to navigate intuitively.

According to the embodiment of the present disclosure, a display method applied in an electronic device is provided, the electronic device is in a first state and has a display area, the display method comprising: obtaining an image; obtaining information entries; displaying the image in the display area; and displaying a first type of the information entry among the information entries, in a first region of the display area by a first identifier with a first display effect, and displaying a second type of the information entry among the information entries, in a second region of the display area by a second identifier with a second display effect; wherein the first type of the information entry is different from the second type of the information entry.

The display method may further comprise: judging whether the information entry belong to the first type of the information entry or the second type of the information entry.

The first region may not overlap with the second region.

The first region may overlap with the second region at least partially, and the area of the first region is larger than that of the second region.

The display method may further comprise: controlling the second region and the first region to move when the electronic device is switched from the first state to the second state.

The display method may further comprise: controlling the first identifier to move in a direction in the first region, and controlling the second identifier to move in the direction in the second region, based on the moving direction of the second region and the first region.

The step of obtaining information entries may comprise: obtaining location information of the electronic device; obtaining orientation information of the electronic device; and obtaining the information entry, based on the location information and the orientation information of the electronic device.

The step of obtaining the information entry based on the location information and the orientation information of the electronic device may further comprise: obtaining location information of the information entry; and the display method may further comprise: computing distance from the electronic device to a real object corresponding to the information entry, based on the location information of the electronic device and the location information of the information entry; and judging whether the information entry belongs to the first type of the information entry or the second type of the information entry, based on the distance.

According to another embodiment of the present disclosure, an electronic device in a first state is provided, comprising: an image obtaining module for obtaining an image; an information entry obtaining module for obtaining information entries; a display module for displaying the image in a display area thereof; and a controlling module for controlling to display a first type of the information entry among the information entries, in a first region of the display area by a first identifier with a first display effect, and to display a second type of the information entry among the information entries, in a second region of the display area by a second identifier with a second display effect; wherein the first type of the information entry is different from the second type of the information entry.

The electronic device may comprise a first judging module for judging whether the information entry belongs to the first type of the information entry or the second type of the information entry.

The controlling module may control the second region and the first region to move when the electronic device switches from the first state to the second state.

The controlling module may control the first identifier to move in a direction in the first region, and control the second identifier to move in the direction in the second region, based on the moving direction of the second region and the first region.

The information entry obtaining module may comprise a first obtaining module for obtaining location information of the electronic device; a second obtaining module for obtaining orientation information of the electronic device; and a third obtaining module for obtaining the information entry, based on the location information and the orientation information of the electronic device.

The third obtaining module may be used to obtain the location information of the information entry, and the electronic device may further comprise a computing module for computing distance from the electronic device to a real object corresponding to the information entry, based on the location information of the electronic device and the location information of the information entry; and a second judging module for judging whether the information entry belongs to the first type of the information entry or the second type of the information entry, based on the distance.

With the electronic device and the display method thereof according to the embodiments of the present disclosure, it can make the fusion of the real-view image and the information entry better, so that the superimposed image of the mark of the information entry and the real-view image meets the vision theory of human being better, and the user experience is improved.

When the planar display is displayed on the screen of the electronic device, the distance from the real object corresponding to the information entry to the user (the electronic device) is reflected better on the screen of the electronic device (i.e., planar display), by displaying the marks of the information entries corresponding to the real objects with different distances to the electronic device in different regions of the screen.

Moreover, by meeting the perspective principle of human eye with different sizes of the first region and the second region, and with different display effects of the identifiers in the first region and the second region, it meets the vision theory of human being better, and the user experience is improved.

According to another embodiment of the present disclosure, a display method applied in an electronic device is provided, the electronic device has a first obtaining module for obtaining a real-view image; a second obtaining module for obtaining a map image; and a display module; the electronic device has a first state and a second state; wherein, the spatial location of the electronic device in the first state is different from that in the second state; the display method comprising: sensing the current state of the electronic device to generate a sensing result; judging whether the sensing result represents that the electronic device is in the first state or in the second state; and controlling the display module to display the real-view image when the sensing result represents that the electronic device is in the first state; controlling the display module to display the map image when the sensing result represents that the electronic device is in the second state.

The display method may further comprise: obtaining location information of the electronic device.

In the display method, the step of controlling the display module to display the map image may comprise: determining the center of the map image based on the location information of the electronic device; determining the scale of the map image based on the size of the display module; and controlling the display module to display the map image based on the determined center and scale of the map image.

The display method may further comprise: acquiring information entries in a predetermined distance from the electronic device, based on the location information of the electronic device; determining a first information entry matching with the real-view image from the information entries; and superimposing the first information entry with the real-view image.

In the display method, the step of superimposing the first information entry with the real-view image may comprise superimposing the first information entry at the corresponding location of the real-view image.

The display method may further comprise: determining a second information entry corresponding to the first information entry in the map image based on the first information entry; determining the scale of the map image in a way suitable for the display of the second information entry based on the size of the display module, when displaying the map image; and superimposing the second information entry on the map image.

In the display method, the step of superimposing the second information entry with the real-view image may comprise superimposing the second information entry at the corresponding location of the real-view image.

The display method may further comprise: displaying a transition image on the display module when the sensing result represents that the electronic device is in a switch from the first state to the second state, or from the second state to the first state.

According to another embodiment of the present disclosure, an electronic device having a first state and a second state is provided, wherein the spatial location of the electronic device in the first state is different from that in the second state, the electronic device comprising:

a first obtaining module for obtaining a real-view image; a second obtaining module for obtaining a map image of a location where the electronic device locates in; a display module for displaying the real-view image or the map image; a sensing module for sensing the current state of the electronic device to generate a sensing result; a judging module for judging whether the sensing result represents that the electronic device is in the first state or in the second state; and a controlling module for controlling the display module to display the real-view image when the sensing result represents that the electronic device is in the first state; controlling the display module to display the map image when the sensing result represents that the electronic device is in the second state.

The electronic device may further comprise: a third obtaining module for obtaining the location information of the electronic device.

The electronic device may further comprise: a map image center determining module for determining the center of the map image based on the location information of the electronic device; and a first scale determining module for determining the scale of the map image based on the size of the display module; and, the controlling module controls the display module to display the map image based on the determined center and scale of the map image when controlling to display the map image.

The electronic device may further comprise: an information entry acquiring module for acquiring information entries in a predetermined distance from the electronic device, based on the location information of the electronic device; a first information entry determining module for determining a first information entry matching with the real-view image from the information entries; and a first superimposing module for superimposing the first information entry on the real-view image.

In the electronic device, the first superimposing module may superimpose the first information entry at the corresponding location of the real-view image.

The electronic device may further comprise: a second information entry determining module for determining a second information entry corresponding to the first information entry in the map image based on the first information entry; and a second scale determining module for determining the scale of the map image in a way suitable for the display of the second information entry based on the size of the display module, when displaying the map image; and a second superimposing module for superimposing the second information entry on the map image.

In the electronic device, the second superimposing module may superimpose the second information entry at the corresponding location of the real-view image.

In the electronic device, the control module may control to display a transition image on the display module when the sensing result represents that the electronic device is in a switch from the first state to the second state, or from the second state to the first state.

With the electronic device and the display method thereof according to the embodiments of the present disclosure, the two views are fused better, and are switched automatically according to different operations to the electronic device by the user to make the electronic device into different states. For example, when the user makes the electronic device to be nearly vertical to the horizontal plane, the electronic device is triggered to display the real-view image; when the user makes the electronic device to be nearly parallel to the horizontal plane, the electronic device is trigged to display the map image (or, switched from the real-view image to the map image). It is simple and convenient for the user, the switches between the two views are smooth, and is consistent with the user habits, whereby the user experience is improved.

Moreover, the whole switch process is done automatically. The real-view image and the map image are switched automatically according to the state of the electronic device, without any additional keys. Thereby, the user operation is convenient and the user experience is improved while the resource of the electronic device is saved.

According to another embodiment of the present disclosure, a file saving method applied in an electronic device is provided, comprising: obtaining a first image comprising multiple objects; obtaining multiple information entries, wherein a first information entry of the multiple information entries corresponds to a first object of the multiple objects, the first information entry corresponds to a first identifier; generating an image file comprising at least the first identifier and the first image; and saving the image file.

The file saving method may further comprise: displaying the first image and the first identifier when opening the image file; and displaying the first information entry corresponding to the first identifier when receiving an operation with the first identifier as the operation target.

The step of generating an image file may comprise superimposing the first identifier on the first image.

The step of generating an image file may further comprise: combining the image superimposed with the first identifier with the first information entry.

The step of obtaining multiple information entries may comprise: obtaining location information of the electronic device; obtaining candidate information entries meeting the predetermined condition based on the location information of the electronic device and the predetermined condition; obtaining orientation information of the electronic device; and selecting the multiple information entries from the candidate information entries based on the orientation information.

The multiple objects may correspond to the multiple real objects, the first information entry may comprise the location information of the corresponding real object; and the step of superimposing the first identifier on the first image may comprise: computing distance from the electronic device to a real object corresponding to the information entry, based on the location information of the electronic device and the location information of the information entry; and classifying the first identifier into a first type of information entry and a second type of information entry based on the distance; and superimposing the first type of the information entry within the first region of the first image with a first display effect; and superimposing the second type of the information entry within the second region of the first image with a second display effect.

According to another embodiment of the present disclosure, an electronic device is provided comprising an image obtaining module for obtaining a first image comprising multiple objects; an information entry obtaining module for obtaining multiple information entries, wherein a first information entry of the multiple information entries corresponds to a first object of the multiple objects, the first information entry corresponds to a first identifier; a generating module for generating an image file comprising at least the first identifier and the first image; and a saving module for saving the image file.

The electronic device may further comprise: a display module for displaying the first image and the first identifier when opening the image file; and displaying the first information entry corresponding to the first identifier when receiving an operation with the first identifier as the operation target.

The generating module may comprise a superimposing module for superimposing the first identifier on the first image.

The generating module may further comprise: a combining module for combining the image superimposed with the first identifier with the first information entry.

The information entry obtaining module may comprise: a first obtaining module for obtaining location information of the electronic device; a second obtaining module for obtaining candidate information entries meeting the predetermined condition based on the location information of the electronic device and the predetermined condition; a third obtaining module for obtaining orientation information of the electronic device; and a selecting module for selecting the multiple information entries from the candidate information entries based on the orientation information.

The multiple objects may correspond to the multiple real objects, the first information entry may comprise the location information of the corresponding real object; and the superimposing module may comprise: a computing module for computing distance from the electronic device to a real object, based on the location information of the electronic device and the location information of the real object; and a classifying module for classifying the first identifier into a first type of information entry and a second type of information entry based on the distance; and a first region superimposing module for superimposing the first type of the information entry within the first region of the first image with a first display effect; and a second region superimposing module for superimposing the second type of the information entry within the second region of the first image with a second display effect.

According to another embodiment of the present disclosure, a file saving method applied in an electronic device is provided, comprising: obtaining a first image comprising multiple objects; obtaining multiple identifiers, wherein a first identifier of the multiple identifiers corresponds to a first object of the multiple objects, the first identifier is used to obtain a first information entry which indicates information of the first object corresponding to the first identifier; generating an image file comprising at least the first identifier and the first image; and saving the image file.

The file saving method may further comprise: displaying the first image and the first identifier when opening the image file; and displaying the first information entry corresponding to the first identifier when receiving an operation with the first identifier as the operation target.

The step of generating an image file may comprise superimposing the first identifier on the first image.

With the electronic device and the file saving method according to the embodiments of the present disclosure, an image file comprising an information entry identifier and an image can be generated and saved, so that the displayed image is consistent with the scenario where the user locates in when using the image file to navigate in a near distance. Thereby, it is convenient for the user to navigate using the image file intuitively and acquire information related to the real object in and out of the scenario, and the user experience is improved.

DETAILED DESCRIPTION

Figure 5A:
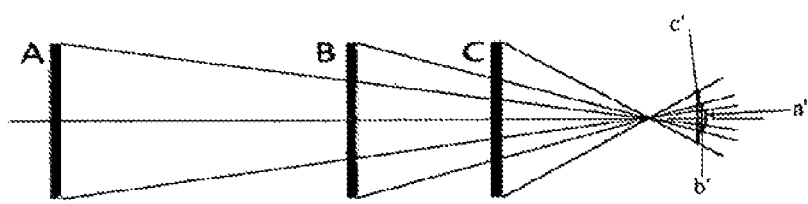
FIGS. 5a-5d are schematic diagrams illustrating the perspective principle of the human eye and applying the principle to the display of the electronic device.

Before the description of the embodiments of the present disclosure, first, the perspective principle of human eye as the principle applied in the present disclosure will be described in brief with reference to FIGS. 5a-5d. Generally, according to the perspective principle of human eye, a near object forms a big image at the human eye, while a distant object forms a small image at the human eye. That is to say, the sizes of the images of the objects with a same height are different due to the different distances of the objects from the user. As shown in FIG. 5a, three objects A, B, C with the same height but different distances from the converging point form the images of a', b' and c', respectively, wherein, c' is the biggest, b' the medium, while a' the smallest.

Figure 5B:
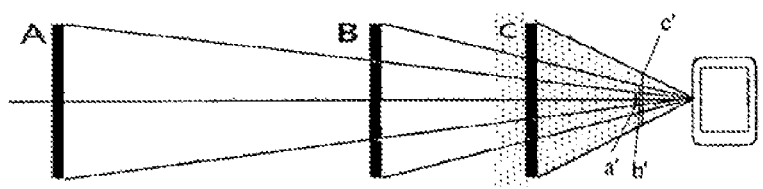

As shown in FIG. 5b, which applies the above principle to the display of the electronic device, the dotted part indicates the view angle of the camera module comprised in the electronic device. In order to make the display ratio of the real objects A, B and C with the same height but different distances from the electronic device on the electronic device meet the perspective principle of human eye, the real objects A, B and C should be displayed with different sizes, so that they are displayed as the view objects a', b' and c' corresponding to the real objects respectively.

Figure 5C:
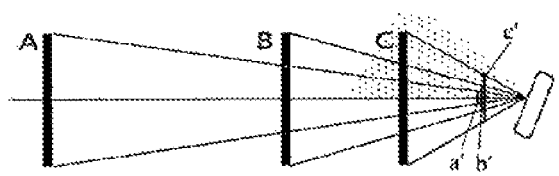
Figure 5D:
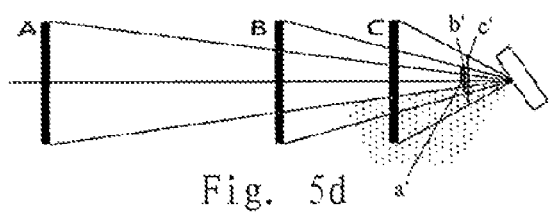

Moreover, as shown in FIGS. 5c and 5d, when the angle between the electronic device and the horizontal plane changes from 90 degree, in order to make the display of the mark corresponding to the real object on the electronic device meet the visual habit of looking up and looking down of the human eye, the shift amount of the display location of the mark corresponding to the real object with a relatively large distance from the electronic device on the electronic device should be large, while the shift amount of the display location of the mark corresponding to the real object with a relatively small distance from the electronic device on the electronic device should be small.

Hereinafter, the embodiments of the present disclosure will be described in detail with reference to the figures.

Figure 1:
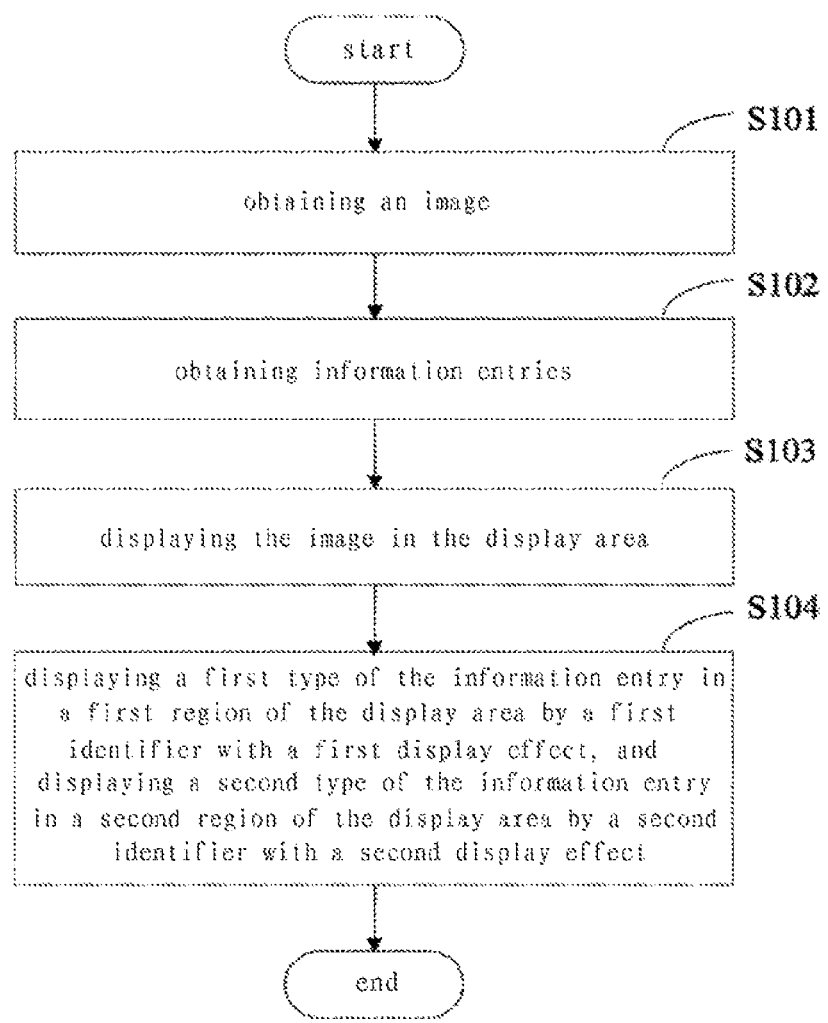
FIG. 1 is a flowchart showing a display method according to an embodiment of the present disclosure.

First, the display method according to an embodiment of the present disclosure will be described with reference to FIG. 1.

The display method according to the embodiment of the present disclosure is applied in an electronic device. The electronic device is for example a mobile terminal. Moreover, the electronic device has a display region. That is to say, the electronic device has a display module.

Moreover, the electronic device is in different states according to the different angles between the display module and the horizontal plane. For example, the angle between the display module and the horizontal plane may be equal to 90 degree (horizontally), larger than 90 degree (looking up) or smaller than 90 degree (looking down), accordingly, the electronic device may be in one of the three states.

The display method may comprise:

Step S101: obtaining an image;

The electronic device may comprise an image obtaining module, such as a camera module. The display method may obtain the image by the camera module. Alternatively, the display method may obtain the image from a remote server or another electronic device etc. through the network. Of course, the display method may also obtain the image from the internal or external memory of the electronic device. The obtained image is a real-view image when the image is obtained from the camera module in real time.

Step S102: obtaining information entries;

In various location based services, information entry is often used, which is a combination of information items on a real object. That is, the information entry corresponds to the real object. The information entry comprises, for example, the geological location information of the real object, the type of the real object (such as the restaurant, the hospital, the school, etc.), the name of the real object, the user comments, etc. The information entry may also be a link to the information related to the real object. The display method may obtain the information entry from the remote server. Alternatively, the display method may obtain the information entry from the internal or external memory of the electronic device.

Step S103: displaying the image in the display area;

Step S104: displaying a first type of the information entry among the information entries, in a first region of the display area by a first identifier (mark) with a first display effect, and displaying a second type of the information entry among the information entries, in a second region of the display area by a second identifier with a second display effect.

It is to be noted that the first type of the information entry is different from the second type of the information entry. For example, the distance from the real object corresponding to the first type of the information entry to the electronic device is different from the distance from the real object corresponding to the second type of the information entry to the electronic device. For example, the real object corresponding to the first type of the information entry is of a relatively small distance from the electronic device, and the real object corresponding to the second type of the information entry is of a relatively large distance from the electronic device.

In addition, the first region may not overlap with the second region. For example, the first region is in the lower part of the display region, and the second region lies in the upper part of the display region. Alternatively, the first region may overlap with the second region at least partially. In this case, the area of the first region is larger than that of the second region. That is, the second region may be within the first region. That is, the situation where the second region is within the first region meets the perspective principle of human eye better according to the human eye perspective principle described above.

In addition, the mark described herein is an identifier for marking the information entry on the image, for example, a sign of a circle, a triangle, etc. In particular, the first mark is used to mark the first type of the information entry on the displayed image, and the second mark is used to mark the second type of the information entry on the displayed image. That is to say, the mark corresponds to the information entry. Since the information entry corresponds to the real object as described above, it can be said that there is a one-to-one correspondence among the mark, the information entry and the real object. In addition, the first mark and the second mark may be the same, for example, a sign of various shapes such as a circle, a triangle, etc. The first mark and the second mark may be different.

In addition, the first display effect and the second display effect may be different, and may be distinguished in various ways such as the display ratio, the color, the transparency etc. For example, the first mark is displayed with a relatively large display ratio by the first display effect, while the second mark is displayed with a relatively small display ratio by the second display effect. For another example, the first mark is displayed non-transparently by the first display effect, while the second mark is displayed translucently by the second display effect. Alternatively, the first display effect and the second display effect may be the same.

According to the display method of the embodiments of the present disclosure, the first type of the information entry is displayed in the first region by the first mark, and the second type of the information entry is displayed in the second region by the second mark. Thereby, the mark of the information entry is displayed in different regions of the display region according to different attributes of the information entry. For example, when the real object corresponding to the information entry belongs to the near object, the mark of the information entry is displayed in the first region of the display region. When the real object corresponding to the information entry belongs to the far object, the mark of the information entry is displayed in the second region of the display region. By displaying different marks in different regions, in comparison with the technology in which the marks are not displayed by region, the display of the marks meets the perspective principle of human eye better, and avoids the overlap display of marks as much as possible when there are multiple marks corresponding to multiple information entries, so that the fusion of the mark of information entry and the image is better, and the user experience is improved.

Hereinafter, the display method according to the embodiment of the present disclosure will be described in more detail with reference to FIG. 2.

Figure 2:
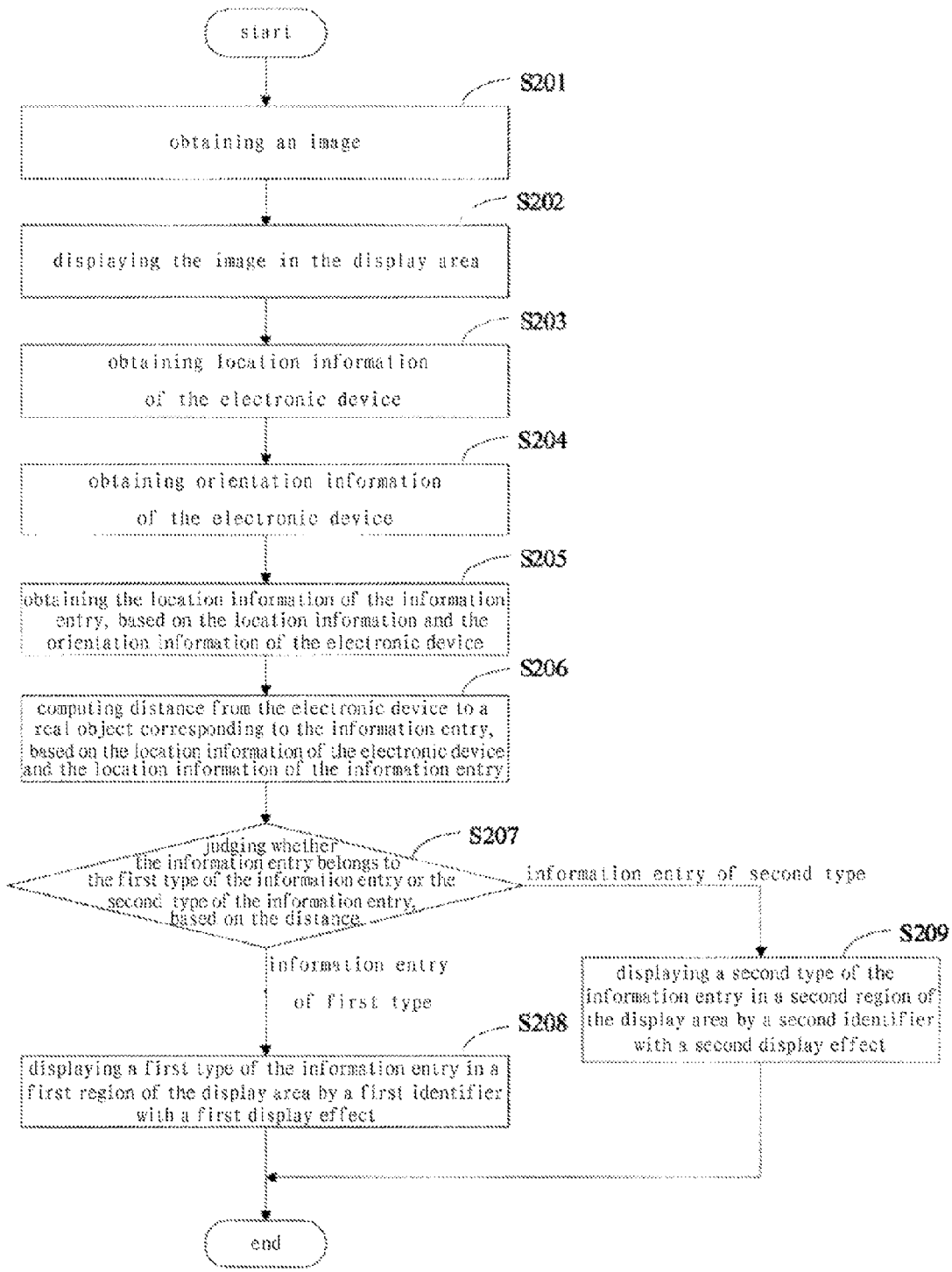
FIG. 2 is a flowchart showing a display method according to another embodiment of the present disclosure.

As shown in FIG. 2, at step S201, the display method according to the embodiment of the present disclosure obtains an image. The operation of step S201 is similar to that of step S101, and is not described here in detail.

At step S202, the image is displayed in the display region. It is to be noted that the order of step S202 and the steps S203-S209 to be described later is not limited to the order shown in FIG. 2. Step S202 may be performed after steps S203-S209, or in parallel to steps S203-S209.

At step S203, the display method obtains location information of the electronic device. For example, the electronic device may comprise a GPS module for location. The display method may obtain the location information of the electronic device by the GPS module. The location information may be for example the longitude and latitude of the electronic device.

At step S204, the display method obtains orientation information of the electronic device. For example, the electronic device may comprise an electronic compass module. The electronic method may obtain the orientation information of the electronic device by the electronic compass module. The orientation information is for example the angle between the direction to which the electronic device faces and the north direction. It is to be noted that step S203 may be performed in any order with step S204 separately.

At step S205, the display method obtains the location information of the information entry, based on the location information and the orientation information of the electronic device. For example, the display method transmits the location information of the electronic device and a predetermined condition (such as 2 km) to the remote server through network. The remote server determines candidate information entries to be transmitted to the electronic device based on the location information of the electronic device and the predetermined condition. As described above, the information entry comprises information items such as the name of the real object corresponding to the information entry, the location information, the type, the comment etc. Then, the electronic device receives the candidate information entries transmitted from the remote server. The candidate information entries obtained at this time are information entries corresponding to all the real objects that meet the predetermined condition (such as a predetermined distance from the electronic device). Since the camera module in the electronic device is of a certain view angle, and the electronic device faces to a certain direction, the real-view object of all the real objects are not comprised in the image obtained by the camera module. Therefore, the display method has to select the final information entries from the candidate information entries based on the orientation information of the electronic device and the view angle of the camera module, and obtain the location information of the real object comprised in the information entry. Alternatively, the electronic device may obtain the information entry from the internal or external memory thereof.

At step S206, the display method computes the distance from the electronic device to a real object corresponding to the information entry, based on the location information of the electronic device and the location information of the information entry. The detailed computing method is known to those skilled in the art, and is not described here in detail.

At step S207, the display method judges whether the information entry belongs to the first type of the information entry or the second type of the information entry, based on the distance. For example, the real object corresponding to the first type of the information entry is relatively near to the electronic device. The real object corresponding to the second type of the information entry is relatively far from the electronic device. In particular, the display method presets a threshold such as 1 km. When the distance from the real object corresponding to the information entry to the electronic device is less than the threshold, it is judged that the information entry belongs to the first type of the information entry. When the distance from the real object corresponding to the information entry to the electronic device is more than or equal to the threshold, it is judged that the information entry belongs to the second type of the information entry.

Of course, the display method may judge the information entry belongs to which type of multiple types. For example, the information entry may comprise a third type of information entry. The real object corresponding to the third type of information entry is of a medium distance from the electronic device. In this case, the display method presets more than one threshold. For example, the first threshold is 0.5 km and the second threshold is 1.5 km. When the distance from the real object corresponding to the information entry to the electronic device is less than or equal to the first threshold, it is judged that the information entry belongs to the first type of the information entry. When the distance from the real object corresponding to the information entry to the electronic device is large than or equal to the second threshold, it is judged that the information entry belongs to the second type of the information entry. When the distance from the real object corresponding to the information entry to the electronic device is larger than the first threshold but smaller than the second threshold, it is judged that the information entry belongs to the third type of information entry.

When it is judged that the information entry belongs to the first type of the information entry at step S207, the display method goes to step S208, and displays the first type of the information entry in the first region of the display region by the first mark with the first display effect. When it is judged that the information entry belongs to the second type of the information entry at step S207, the display method goes to step S209, and displays the second type of the information entry in the second region of the display region by the second mark with the second display effect. The detailed operation is similar to that of step S104, and is not described here in detail.

Moreover, preferably, at step S206, the angle between the line from the electronic device to the real object corresponding to the information entry and the orientation of the electronic device is computed, based on the location information of the electronic device, the location information of the information entry and the orientation information of the electronic device. At steps S208 and S209, it is judged whether the first type of the information entry and the second type of the information entry should be displayed in the left part or the right part of the display region, based on the computed angle, so that the fusion of the mark of the information entry and the real-view image becomes better.

According to the display method of the embodiments of the present disclosure, the first type of the information entry is displayed in the first region by the first mark, and the second type of the information entry is displayed in the second region by the second mark. Thereby, the mark of the information entry is displayed in different regions of the display region according to different attributes of the information entry. For example, when the real object corresponding to the information entry belongs to the near object, the mark of the information entry is displayed in the first region of the display region. When the real object corresponding to the information entry belongs to the far object, the mark of the information entry is displayed in the second region of the display region. By displaying different marks in different regions, in comparison with the technology in which the marks are not displayed by region, the display of the marks meets the perspective principle of human eye better, and avoids the overlap display of marks as much as possible when there are multiple marks corresponding to multiple information entries, so that the fusion of the mark of information entry and the image becomes better, and the user experience is improved.

In addition, the electronic device may be in different states according to the different angles between the display module and the horizontal plane. For example, the angle between the display module and the horizontal plane may be equal to 90 degree (horizontally), larger than 90 degree (looking up) or smaller than 90 degree (looking down). Assume that the electronic device is in a state where the angle between the electronic device and the horizontal plane is equal to 90 degree.

Figure 6A:
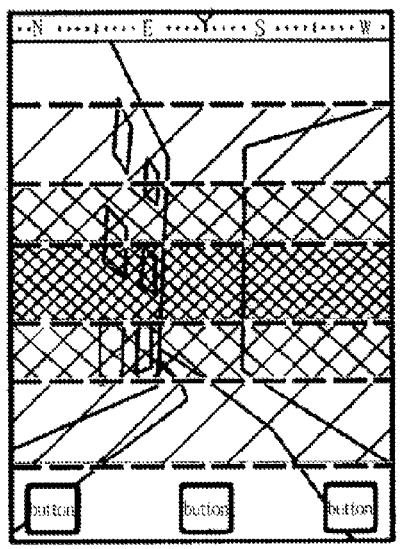
FIGS. 6a-6c are schematic diagrams showing the display of the electronic device in different states according to embodiments of the present disclosure.

If the angle between the electronic device and the horizontal plane becomes larger than 90 degree, in order to make the fusion of the mark of the information entry and the image become better, the display location of the mark changes accordingly. In particular, as shown in FIG. 6a, assuming that the first region is the region in the display region which is indicated by the diagonal line, and the second region is the region in the display region which is indicated by the big grid. The display method may also comprise a third region indicated by the small grid. The area of the first region occupying the display screen is larger than that of the second region, and the area of the second region occupying the display screen is larger than that of the third region. The middle lines of the first region, the second region and the third region overlap with each other. In particular, the middle lines of the first region, the second region and the third region overlap with the middle line of the display screen. When the real object corresponding to the information entry belongs to the near object with respect to the electronic device, the mark of the information entry is displayed in the first region of the display region, and may be located in any place in the first region. Of course, if the object displaying on the display screen corresponds to the real object corresponding to the information entry, the mark of the information entry is displayed in a location within the first region where the object displayed on the display screen corresponding to the real object locates in. When the real object corresponding to the information entry belongs to the far object with respect to the electronic device, the mark of the information entry is displayed in the second region of the display region, and may be located in any place in the second region. Of course, if the object displaying on the display screen corresponds to the real object corresponding to the information entry, the mark of the information entry is displayed in a location within the second region where the object displayed on the display screen corresponding to the real object locates in. By displaying the mark of the information entry corresponding to the real object with different distances from the electronic device in different regions of the screen, the distance from the real object corresponding to the information entry and the user (the electronic device) is reflected better on the display screen of the electronic device (i.e., planar display). Optionally, the present application may classify the real object corresponding to the information entry into three classes based on the distance from the real object to the electronic device. When the real object corresponding to the information entry belongs to the near object with respect to the electronic device, the mark of the information entry is displayed in the first region of the display region. When the real object corresponding to the information entry belongs to the far object with respect to the electronic device, the mark of the information entry is displayed in the third region of the display region. When the real object corresponding to the information entry belongs to the medium object between the near object and the far object with respect to the electronic device, the mark of the information entry is displayed in the second region of the display region. Each region corresponds to a display effect to display the mark of the information entry, and the display effects of the display mark in different regions are different. For example, the mark of the first region is displayed with a first display ratio, the mark of the first region is displayed with a second display ratio, and the mark of the third region is displayed with a third display ratio. The first display ratio is larger than the second display ratio, and the second display ratio is larger than the third display ratio. According to the principle that the same object seems to be smaller when it is close to the human eye and seems to be larger when it is far from the human eye, in the present embodiment, according to the above principle, the areas of the first region, the second region and the third region are different, and the display effects of the first region, the second region and the third region are different. That is, more marks are displayed in the larger region, and the marks are displayed with a large display ratio, to meet the perspective principle of human eye. In the case of FIG. 6a, the area of the second region is smaller than that of the first region, and the second region is within the first region. It is to be noted that FIG. 6a is only an example of the display method. The first region and the second region may not overlap with each other at all, or overlap partially. In addition, the lines for indicating the first region and the second region are not really displayed on the electronic device.

Figure 6B:
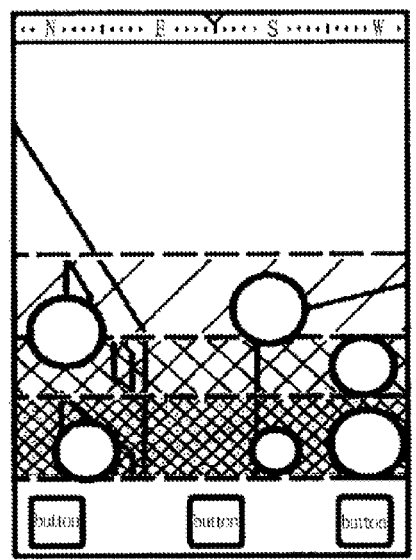

When the angle between the electronic device and the horizontal plane becomes larger, as shown in FIG. 6b, the display method controls the second region and the first region to move down. When the second region or the first region is totally moved out of the lower edge of the screen, the moving is stopped. At this time, correspondingly, the display method controls the first mark of the information entry of the first type to move in the first region in a direction according to the direction in which the first region and the second region move, and controls the second mark of the information entry of the second type to move in the second region in such direction. That is, the display method controls the first mark to move downwards, and controls the second mark to move downwards. When there is a part of the region moving out of the screen, the first mark and the second mark in the part of the region moving out of the screen remain to stay at the lower edge of the screen. The moving speed of the first mark and the second mark may be a preset value, or may be determined according to the moving speed of the electronic device by an accelerator. Optionally, in order to meet the perspective principle of human eye described above, the display method may control the moving speed of the first mark to be smaller than that of the second mark.

Figure 6C:
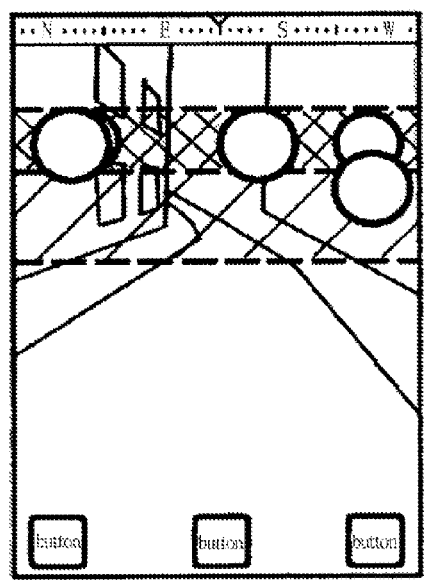

Moreover, when the angle between the electronic device and the horizontal plane becomes smaller, as shown in FIG. 6c, the display method controls the second region and the first region to move upwards. When the second region or the first region is totally moved out of the upper edge of the screen, the moving is stopped. At this time, correspondingly, the display method controls the first mark of the information entry of the first type to move in the first region in a direction according to the direction in which the first region and the second region move, and controls the second mark of the information entry of the second type to move in the second region in such direction. That is, the display method controls the first mark to move upwards, and controls the second mark to move upwards. When there is a part of the region moving out of the screen, the first mark and the second mark in the part of the region moving out of the screen remain to stay at the upper edge of the screen. The moving speed of the first mark and the second mark may be a preset value, or may be determined according to the moving speed of the electronic device by an accelerator. Optionally, in order to meet the perspective principle of human eye described above, the display method may control the moving speed of the first mark to be smaller than that of the second mark.

Thereby, with the display method according to the embodiment of present disclosure, when the electronic device is in different states, the mark of the information entry is correspondingly moved in different regions of the display area, and the moving speed of the mark is determined according to the property of the information entry, so that the fusion of the mark of the information entry and the image may be better in different states to further improve the user experience.

The display method according to the embodiment of present disclosure has been described above. Next, the electronic device according to the embodiment of present disclosure will be described with reference to FIGS. 3 and 4.

Figure 3:
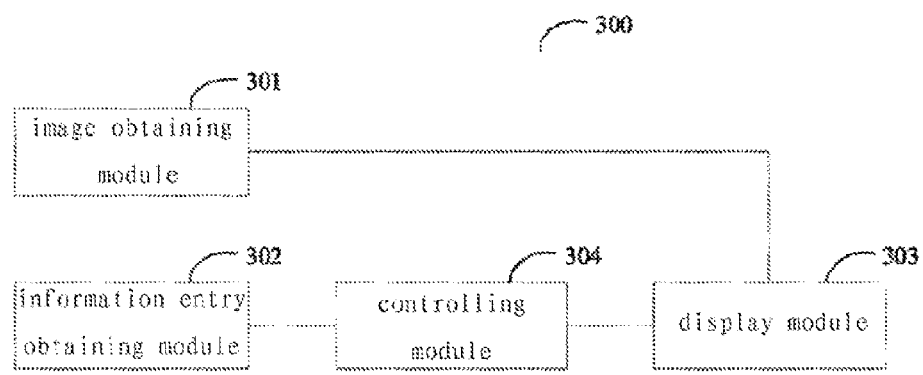
FIG. 3 is a block diagram showing the main configuration of an electronic device according to an embodiment of the present disclosure.

FIG. 3 is a block diagram showing the main configuration of the electronic device 300 according to the embodiment of present disclosure.

As shown in FIG. 3, the electronic device 300 comprises:

an image obtaining module 301 for obtaining an image;

an information entry obtaining module 302 for obtaining information entries;

a display module 303 for displaying the image in a display area thereof; and a controlling module 304 for controlling to display a first type of the information entry among the information entries, in a first region of the display area with a first display effect, and to display a second type of the information entry among the information entries, in a second region of the display area with a second display effect;

wherein the first type of the information entry is different from the second type of the information entry.

The image obtaining module 301 may be such as a camera module. The electronic device may obtain the image by the camera module. Alternatively, the electronic device may obtain the image from a remote server or another electronic device etc. through the network. Of course, the electronic device may also obtain the image from the internal or external memory of the electronic device. The obtained image is a real-view image when the image is obtained from the camera module in real time.

The information entry obtaining module 302 may obtain the information entry from the remote server. Alternatively, the information entry obtaining module 302 may obtain the information entry from the internal or external memory of the electronic device.

The controlling module 304 may be used to control the first region and the second region to move when the electronic device is switched from the first state to the second state.

The controlling module 304 may control the first mark to move in the first region in a direction in which the second region and the first region move, and control the second mark to move in the second region in the direction.

In addition, the electronic device 300 may comprise a first judging module connected to the information entry obtaining module 302 and the controlling module 304, for judging whether the information entry belongs to the first type of the information entry or the second type of the information entry.

According to the electronic device of the embodiments of the present disclosure, the first type of the information entry is displayed in the first region by the first mark, and the second type of the information entry is displayed in the second region by the second mark. Thereby, the mark of the information entry is displayed in different regions of the display region according to different attributes of the information entry. For example, when the real object corresponding to the information entry belongs to the near object, the mark of the information entry is displayed in the first region of the display region. When the real object corresponding to the information entry belongs to the far object, the mark of the information entry is displayed in the second region of the display region. By displaying different marks in different regions, in comparison with the technology in which the marks are not displayed by region, the display of the marks meets the perspective principle of human eye better, and avoids the overlap display of marks as much as possible when there are multiple marks corresponding to multiple information entries, so that the fusion of the mark of information entry and the image merge is better, and the user experience is improved.

Figure 4:
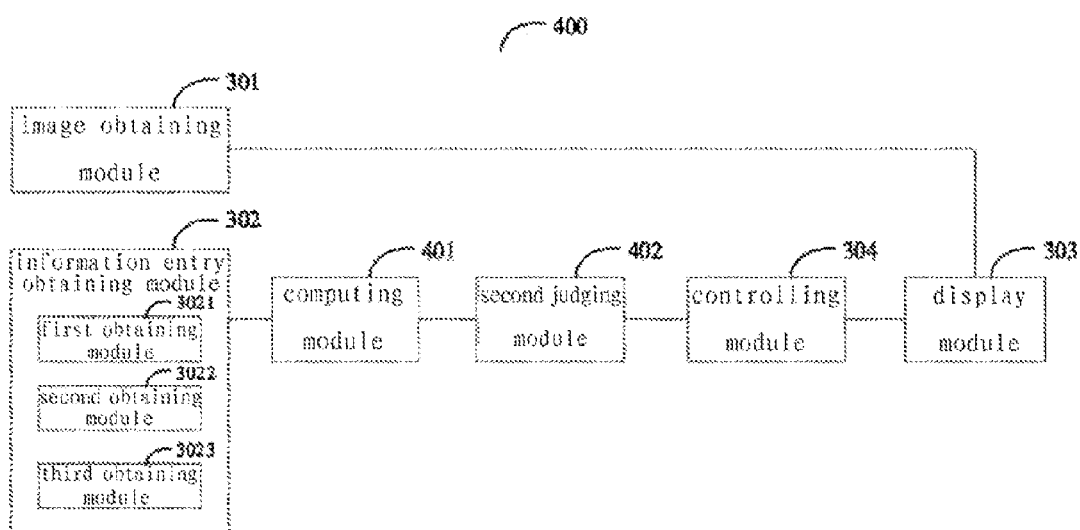
FIG. 4 is a block diagram showing the main configuration of an electronic device according to another embodiment of the present disclosure.

FIG. 4 is a schematic diagram showing the main configuration of the electronic device 400 according to another embodiment of the present disclosure.

As shown in FIG. 4, in addition to the image obtaining module 301, the information entry obtaining module 302 and the display module 303 with a same configuration and function as those in FIG. 3, the electronic device 400 further comprises:

a computing module 401 for computing the distance from the information entry to the electronic device based on the location information of the electronic device and the location information of the information entry;

a second judging module 402 for judging whether the information entry belongs to the information entry of the first type or the second type based on the distance; and the information entry obtaining module 302 comprises:

a first obtaining module 3021 for obtaining location information of the electronic device;

a second obtaining module 3022 for obtaining orientation information of the electronic device; and a third obtaining module 3023 for obtaining the information entry, based on the location information and the orientation information of the electronic device.

The first obtaining module 3021 may be a GPS module for location, for example. The electronic device 400 may obtain the location information of the electronic device by the GPS module. The location information may be for example the longitude and latitude of the electronic device.

The second obtaining module 3022 may be an electronic compass module, for example. The electronic device 400 may obtain the orientation information of the electronic device by the electronic compass module. The orientation information is for example the angle between the direction to which the electronic device faces and the north direction.

The third obtaining module 3023 may transmit the location information of the electronic device and a predetermined condition (such as 2 km) to the remote server through network. The remote server determines candidate information entries to be transmitted to the electronic device based on the location information of the electronic device and the predetermined condition. As described above, the information entry comprises information items such as the name of the real object corresponding to the information entry, the location information, the type, the comment etc. Then, the third obtaining module 3023 receives the candidate information entries transmitted from the remote server. The candidate information entries obtained at this time are information entries corresponding to all the real objects that meet the predetermined condition (such as a predetermined distance from the electronic device). Since the camera module in the electronic device is of a certain view angle, and the electronic device faces to a certain direction, the real-view object of all the real objects are not comprised in the image obtained by the camera module. Therefore, the third obtaining module 3023 has to select the final information entries from the candidate information entries based on the orientation information of the electronic device and the view angle of the camera module, and obtain the location information of the real object comprised in the information entry. Alternatively, the third obtaining module 3023 may obtain the information entry from the internal or external memory thereof.

The computing module 401 computes the distance from the electronic device to a real object corresponding to the information entry, based on the location information of the electronic device and the location information of the information entry. The detailed computing method is known to those skilled in the art, and is not described here in detail.

The second judging module 402 judges whether the information entry belongs to the first type of the information entry or the second type of the information entry, based on the distance. For example, the real object corresponding to the first type of the information entry is relatively near to the electronic device. The real object corresponding to the second type of the information entry is relatively far from the electronic device. In particular, the second judging module 402 presets a threshold such as 1 km. When the distance from the real object corresponding to the information entry to the electronic device is less than the threshold, it is judged that the information entry belongs to the first type of the information entry. When the distance from the real object corresponding to the information entry to the electronic device is more than or equal to the threshold, it is judged that the information entry belongs to the second type of the information entry.

Of course, the second judging module 402 may judge the information entry belongs to which type of multiple types. For example, the information entry may comprise a third type of information entry. The real object corresponding to the third type of information entry is of a medium distance from the electronic device. In this case, the second judging module 402 presets more than one threshold. For example, the first threshold is 0.5 km and the second threshold is 1.5 km. When the distance from the real object corresponding to the information entry to the electronic device is less than or equal to the first threshold, it is judged that the information entry belongs to the first type of the information entry. When the distance from the real object corresponding to the information entry to the electronic device is large than or equal to the second threshold, it is judged that the information entry belongs to the second type of the information entry. When the distance from the real object corresponding to the information entry to the electronic device is larger than the first threshold but smaller than the second threshold, it is judged that the information entry belongs to the third type of the information entry.

When the second judging module 402 judges that the information entry belongs to the first type of the information entry, the controlling module 304 displays the first type of the information entry in the first region of the display region by the first mark with the first display effect. When the second judging module 402 judges that the information entry belongs to the second type of the information entry, the controlling module 304 displays the second type of the information entry in the second region of the display region by the second mark with the second display effect. The detailed operation is similar to that in FIG. 3, and is not described here in detail.

Moreover, optionally, the angle between the line from the electronic device to the real object corresponding to the information entry and the orientation of the electronic device may be computed by the computing module 401, based on the location information of the electronic device, the location information of the information entry and the orientation information of the electronic device. The controlling module 304 judges whether the first type of the information entry and the second type of the information entry should be displayed in the left part or the right part of the display region, based on the computed angle, so that the fusion of the mark of the information entry and the real-view image is better.

According to the electronic device of the embodiments of the present disclosure, the first type of the information entry is displayed in the first region by the first mark, and the second type of the information entry is displayed in the second region by the second mark. Thereby, the mark of the information entry is displayed in different regions of the display region according to different attributes of the information entry. For example, when the real object corresponding to the information entry belongs to the near object, the mark of the information entry is displayed in the first region of the display region. When the real object corresponding to the information entry belongs to the far object, the mark of the information entry is displayed in the second region of the display region. By displaying different marks in different regions, in comparison with the technology in which the marks are not displayed by region, the display of the marks meets the perspective principle of human eye better, and avoids the overlap display of marks as much as possible when there are multiple marks corresponding to multiple information entries, so that the mark of information entry and the image merge more truly, and the user experience is improved.

In the following, an electronic device and the display method will be described with reference to FIGS. 7-9.

First, the display method according to the embodiment of the disclosure will be described.

Figure 8A:
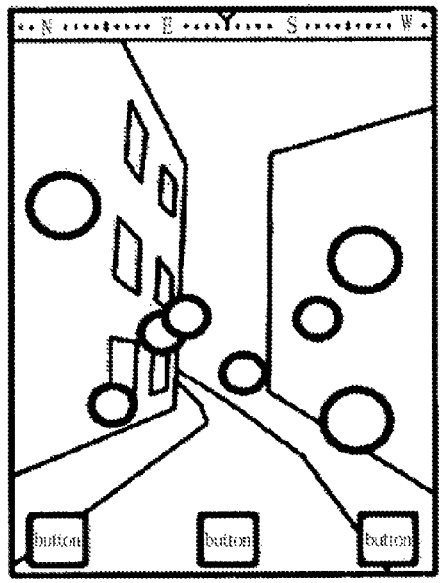
FIGS. 8a-8c are schematic diagrams showing the real-view image and the map image displayed by the display method according to embodiments of the present disclosure.
Figure 8B:
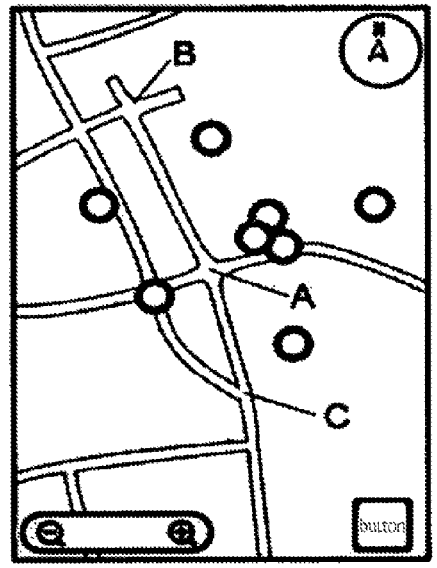

The display method is applied in an electronic device. The electronic device is for example a mobile terminal etc. The electronic device comprises a display module. Moreover, the electronic device comprises a first obtaining module for obtaining a real-view image. The first obtaining module is for example the camera module of the electronic device. When the camera module is activated, the live-view (real-view) image is displayed on the display module. The real-view image may be stored in the electronic device, or may not be stored. Moreover, the first obtaining module may obtain the real-view image from the server. In addition, the electronic device also comprises a second obtaining module for obtaining a map image. The map image may be stored in the electronic device, or may be obtained from the server through network by the second obtaining module. The live-view image and the map image are shown in FIGS. 8a and 8b, respectively.

Moreover, the electronic device has a first state and a second state. The display module of the electronic device is in a vertical state perpendicular to the horizontal plane, for example, in the first state, and in a horizontal state in parallel to the horizontal plane in the second state. Alternatively, the first state may be a state in which the angle between the display module of the electronic device and the horizontal plane is within a first range, and the second state may be a state in which the angle between the display module of the electronic device and the horizontal plane is within a second range. Alternatively, the first state may be a state in which the user of the electronic device grasps the electronic device in a first posture, and the second state may be a state in which the user of the electronic device grasps the electronic device in a second posture. In summary, the spatial location of the electronic device in the first state is different from that in the second state.

The sensing operation of the first state and the second state, as well as the display operation in the first state and the second state, in the display method according to the embodiment of the disclosure will be described in detail with reference to the flowchart of FIG. 7.

Figure 7:
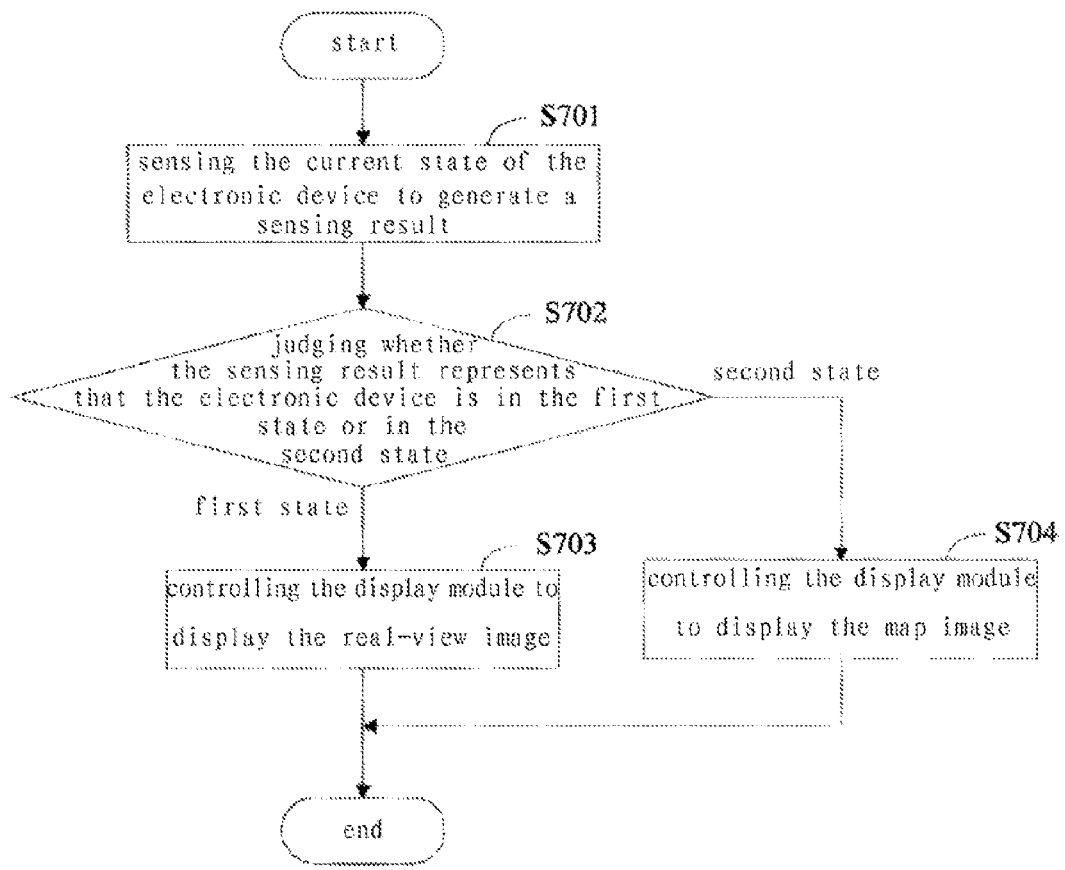
FIG. 7 is a flowchart showing a display method according to another embodiment of the present disclosure.

FIG. 7 is a flowchart of the display method according to the embodiment of the disclosure. As shown in FIG. 7, the display method comprises:

step S701: sensing the current state of the electronic device to generate a sensing result;

The electronic device comprises a sensing module for example. The sensing module is for example an accelerator sensor, a touch sensor etc. For example, when the sensing module is the accelerator sensor, the display method senses the current state of the electronic device to generate a sensing result. The sensing result is for example the acceleration of the electronic device or the angle between the electronic device and the horizontal plane. For another example, when the sensing module is a touch sensor, the display method senses the current state of the electronic device to generate a sensing result. The sensing result is for example the contact point information of the object grasping the electronic device (e.g., the finger of the user, or the dock of the electronic device). Of course, the display method may also use other sensors than the accelerator sensor and the touch sensor, as long as it can detect the current state of the electronic device.

Step S702: judging whether the sensing result represents that the electronic device is in the first state or in the second state;

As described above, the first state may be for example a state in which the display module of the electronic device is perpendicular to the horizontal plane. The second state may be for example a state in which the display module of the electronic device is in parallel to the horizontal plane. In this case, when the sensing result is 90 degree, the display method judges that the sensing result represents that the electronic device is in the first state. When the sensing result is 0 degree, the display method judges that the sensing result represents that the electronic device is in the second state. In addition, optionally, when the sensing result is a value between 90 degree and 0 degree, the display method judges that the sensing result represents that the electronic device is switching from the first state to the second state or from the second state to the first state.

Also, as described above, the first state may be a state in which the angle between the display module of the electronic device and the horizontal plane is within a first range. The first range is for example from 30 degree to 90 degree. The second state may be a state in which the angle between the display module of the electronic device and the horizontal plane is within a second range. The second range is for example from 0 degree to 30 degree. In this case, when the sensing result is for example 70 degree, the display method judges that the sensing result represents that the electronic device is in the first state. When the sensing result is for example 20 degree, the display method judges that the sensing result represents that the electronic device is in the second state. Also, optionally, when the sensing result is 30 degree, the display method judges that the sensing result represents that the electronic device is switching from the first state to the second state or from the second state to the first state.

Moreover, as described above, the first state may be a state in which the user of the electronic device grasps the electronic device in a first posture, and the second state may be a state in which the user of the electronic device grasps the electronic device in a second posture. In this case, when the sensing result is that the contact point is near the two long sides of the electronic device (for example when the user grasps the electronic device by a single hand), or when the sensing result is that the contact point is at the predetermined position of the electronic device (for example, when the user locates the electronic device in the in-car dock), the display method judges that the sensing result represents that electronic device is in the first state. When the sensing result is that the contact point is near the two short sides of the electronic device (for example when the user grasps the electronic device by two hands), the display method judges that the sensing result represents that electronic device is in the second state.

When the sensing result represents that the electronic device is in the first state, the display method goes to step S703, and controls the display module to display the real-view image as shown in FIG. 8*a*. When the sensing result represents that the electronic device is in the second state, the display method goes to step S704, and controls the display module to display the map image as shown in FIG. 8*b*.

Thereby, when it is sensed that the user puts the electronic device in an almost vertical or vertical state (for example, when the angle between the display module of the electronic device and the horizontal plane is within a range from 30 degree to 90 degree), or it is sensed that the user grasps the electronic device in a first posture (for example, when the user grasps the electronic device by a single hand or when the user locates the electronic device in the in-car dock), the display module of the electronic device displays the real-view image. When it is sensed that the user puts the electronic device in a almost horizontal or horizontal state (for example, when the angle between the display module of the electronic device and the horizontal plane is within a range from 0 degree to 30 degree), or it is sensed that the user grasps the electronic device in a second posture (for example, when the user grasps the electronic device by two hands), the display module of the electronic device displays the map image, whereby free switching between the real-view image and the map image is achieved without additional keys.

The switching way is consistent with the cognitive habit of the user, and fully utilizes the properties of the real-view image and the map image. In particular, when the electronic device is in a nearly horizontal or horizontal state, most part of the real-view image displayed on the display module of the electronic device is the ground or the sky, and is not closely related to the scenario. Thereby, when the electronic device is in a nearly horizontal or horizontal state, it is suitable for displaying the map image. On the other hand, when the electronic device is in a vertical state, it can achieve the best effect by displaying the real-view image.

Thereby, with the display method according to the embodiment of the disclosure, the real-view image and the map image can be switched automatically according to the state of the electronic device without additional keys, to ease the user operation and improve the user experience while saving the resource of the electronic device.

In addition, optionally, the display method may further comprise obtaining location information of the electronic device. The location information for example may be obtained by the third obtaining module comprised in the electronic device. The third obtaining module is for example a GPS module.

In this case, when the map image is controlled to be displayed on the display module, the display method determines the center of the map image according to the location information of the electronic device. That is, the display method sets the point corresponding to the location where the electronic device locates in as the center of the map image. Of course, the display method may not need to set the point corresponding to the location where the electronic device locates in as the center of the map image, but rather to set the point corresponding to the location where the electronic device locates in as any predetermined location of the map image, for example, the lower middle point of the map image. When the electronic device is used for navigation, such arrangement is often more suitable for checking by the user.

Then, the display method determines the scale of the map image based on the size of the display module. If the scale is too large, the region that can be displayed by the map image is limited, and it is not suitable for navigation. For example, in the case of FIG. 8b, the user is currently at location point A, if the scale is too large to display the full path from point B to C, the region displayed by the map image is too small, and the user cannot fully use the map image for navigation. If the scale is too small, the map image cannot be displayed clearly and even cannot show the path from point B to C, which is also not suitable for navigation. Therefore, the display method needs to determine the scale of the map image considering the size of the display module and the watching effect. The method for determining the scale of the map image is known to those skilled in the art, and will not be described here in detail.

Then, the display method controls the display module to display the map image based on the determined center (or the determined predetermined position of the map image) and scale of the map image. Thereby, the obtained real-view image and the map image to be displayed are related to each other. In particular, the real-view image and the map image are related through the location information. That is, the map image to be displayed is obtained based on the location information when obtaining the real-view image.

Moreover, the display method may also display the information entry related to the location information of the electronic device in the real-view image when displaying the real-view image, after obtaining the location information of the electronic device. In particular, the display method acquires information entries in a predetermined distance from the electronic device, based on the location information of the electronic device. That is, the display method acquires all information entries in a circular region with a center of the location of the electronic device, and a radius of a predetermined distance. The predetermined distance may be specified by the user or determined by the server by default. The information entry may be a point related to the object in the real-view image or the map image. The information on the information entry may include the location information, the property information, the comment information, etc.

Then, the display method determines the direction to which the electronic device faces by the orientation module such as an electronic compass comprised in the electronic device, and determines a first information entry matching with the real-view image from the information entries. In particular, among all information entries in the circular region obtained as described above, the display method determines the information entry contained in the real-view image obtained by the camera module of the electronic device, i.e., the first information entry displayed on the real-view image, based on the direction to which the electronic device faces and the view field information of the camera module itself. Thereby, the display method determines the first information entry matching with the real-view image.

Then, the display method superimposes the first information entry on the real-view image, and displays it, then obtains the real-view image as shown in FIG. 8a.

Optionally, the display method may further determines the horizontal coordinate of the location of the information entry superimposed with the real-view image, based on the compass information of the electronic device and the view field information of the camera module and the location information of the information entry, when superimposing the first information entry with the real-view image. If the information entry comprises height information, the display method may determine the vertical coordinate of the location of the information entry superimposing with the real-view image based on the height information, thereby superimposing the first information entry at the corresponding location of the real-view image. In the obtained real-view image, the information entry is superimposed at the corresponding location of the real-view image, thereby the user may know the real-view image as well as the detailed location of the information entry of interest in the real-view image better and conveniently, and the user experience is greatly improved.

When displaying the map image, the display method determines a second information entry corresponding to the first information entry in the map image based on the first information entry. The second information entry may be the same as the first information entry, or alternatively may be a part of the first information entry, or alternatively may contain the first information entry.

In addition, the display method determines the scale of the map image in a way suitable for the display of the second information entry based on the size of the display module. Similarly, the scale needs to be suitable for navigation by the user using the map image.

Then, the display method superimposes the second information entry on the map image.

In particular, the display method may display the map image in the following way. For example, when the display is switched from the real-view image to the map image, the display method arranges the point corresponding to the location where the user currently locates in to the predetermined location of the display module, for example the bottom center part, and displays the map image according to the fixed original scale. Then, the display method obtains the current information entry on the current map image, and performs a first comparison with the first information entry.

If the number of the current information entries is less than that of the first information entries, the display method maintains the point corresponding to the location where the user currently locates in as it is, and enlarges the scale, and then continues the first comparison.

When the number of the current information entry is not less than that of the first information entries, the display method determines the information entry nearest to the edge of the display module from the current information entries, computes the distance from the information entry to the screen edge, and performs the second comparison between the distance and the predetermined threshold. When the distance is shorter than the predetermined threshold, the display method maintains the point corresponding to the location where the user currently locates in as it is, and decreases the scale. When the distance is longer than the predetermined threshold, the display method maintains the point corresponding to the location where the user currently locates in at as it is, and enlarges the scale. When the distance is equal to the predetermined threshold, the display method obtains the map image based on the current scale as the final map image to be displayed. Thereby, the second information entries in the map image comprises all the first information entries in the real-view image, and are displayed in a scale suitable for watching by the user, thereby it is convenient for the user operation, and improves the user experience.

The second information entry may be displayed independent of the map image, for example, displayed at the predetermined position at the lower part of the display module. Optionally, the second information entry may be displayed by superimposing with the map image. At this time, the second information entry is superimposed at the corresponding position of the map image based on the location information of the second information entry. Thereby, the user may watch the map image conveniently by superimposing the second information entry and displaying the map image with a proper scale by the display method, and the user may know the relationship between the information entry of interest and the location where the user locates in, so that the user experience is greatly improved.

Figure 8C:
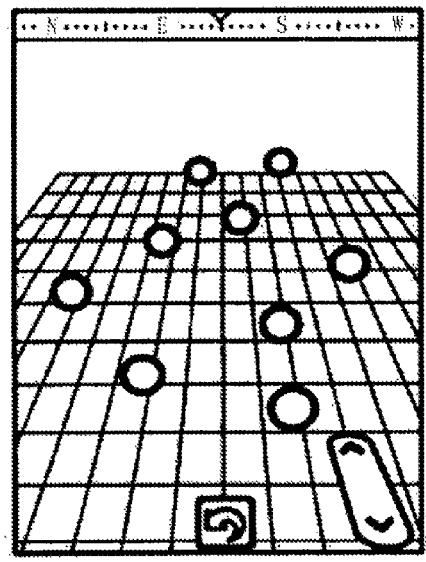

Moreover, to enrich the display effect and improve the user experience, when the sensing result represents that the electronic device is switching from the first state to the second state or from the second state to the first state, the display method controls to display a transition image on the display module, which is shown in FIG. 8c as an example. In particular, when the electronic device is switched from the first state to the second state, the display method controls the image on the display module to be switched from the real-view image to the transition image, and then from the transition image to the map image. When the real-view image and the map image contain the information entry, the information entry is moved upwards from its position on the real-view image. A predetermined picture of a 3D ground will be presented gradually on the display module, and the information entries will gradually move to the corresponding position on the 3D ground. Then, the 3D ground gradually becomes transparent and disappears, and the map image is displayed. The change when the electronic device is switched from the second state to the first state is opposite to this change, and will not be described here in detail. It is to be noted that, those skilled in the art can understand that the implementation of the transition image and the moving manner of the information entry are not limited to the above particular implementation.

The display method according to the embodiment of the present disclosure has been described above. With the display method according to the embodiment of the present disclosure, the real-view image and the map image may be switched according to the state of the electronic device in a way consistent with the user habits, without additional buttons. Thereby, it is convenient to operate and the user experience is improved, while the resource of the electronic device is saved.

In the following, the electronic device 900 according to the embodiment of the present disclosure will be described with reference to FIG. 9. The electronic device 900 is for example a mobile terminal etc. The electronic device 900 has a first state and a second state. As described in the display method according to the embodiment of the present disclosure, the spatial location of the electronic device in the first state is different from that in the second state.

Figure 9:
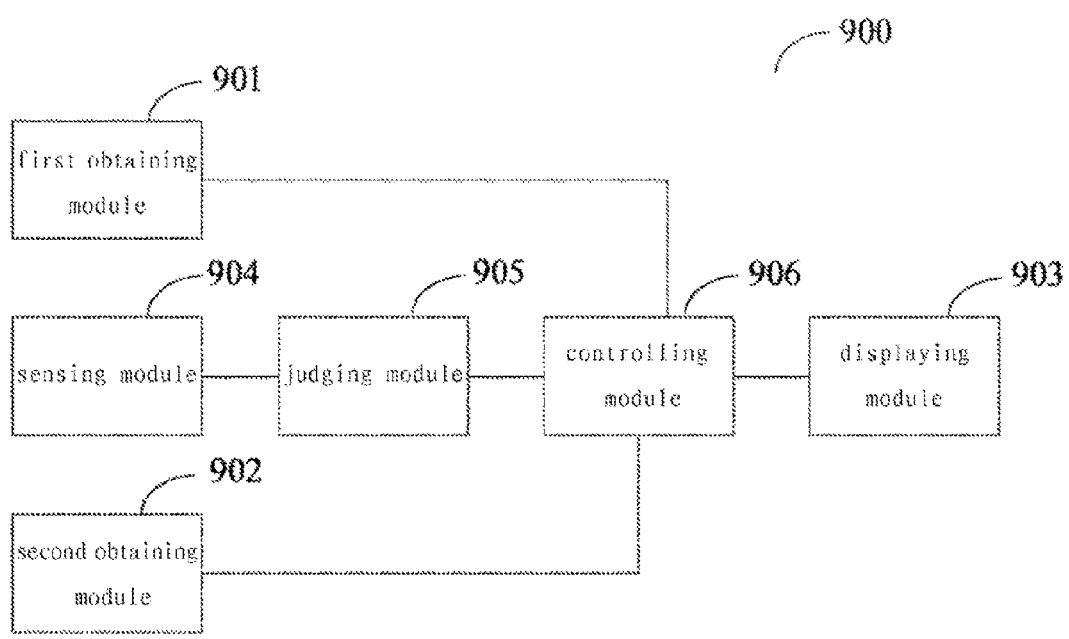
FIG. 9 is a block diagram showing the structure of the electronic device according to an embodiment of the present disclosure.

As shown in FIG. 9, the electronic device 900 comprises:
a first obtaining module 901 for obtaining a real-view image;
a second obtaining module 902 for obtaining a map image of a location where the electronic device locates in;
a display module 903 for displaying the real-view image or the map image;
a sensing module 904 for sensing the current state of the electronic device to generate a sensing result;
a judging module 905 for judging whether the sensing result represents that the electronic device is in the first state or in the second state; and
a controlling module 906 for controlling the display module to display the real-view image when the sensing result represents that the electronic device is in the first state;
controlling the display module to display the map image when the sensing result represents that the electronic device is in the second state.

The first obtaining module 901 is for example the camera module of the electronic device. When the camera module is activated, the real-view image is displayed on the display module 903. The real-view image may be stored in the electronic device, or alternatively not stored. Moreover, the first obtaining module 901 may obtain the real-view image from the server through the network. In addition, the map image may be stored in the electronic device, or be obtained from the server through the network by the second obtaining module 902. The real-view image and the map image are for example as shown in FIGS. 8a and 8b, respectively.

The sensing module 904 is for example an accelerator sensor, a touch sensor etc. For example, when the sensing module 904 is the accelerator sensor, the sensing result is for example the acceleration of the electronic device or the angle between the electronic device and the horizontal plane. For another example, when the sensing module 904 is a touch sensor, the sensing result is for example the contact point information of the object grasping the electronic device (e.g., the finger of the user, or the dock of the electronic device). Of course, the electronic device may also use other sensors than the accelerator sensor and the touch sensor, as long as it can detect the state of the electronic device.

In addition, as described above, the first state may be for example a state in which the display module of the electronic device is perpendicular to the horizontal plane. The second state may be for example a state in which the display module of the electronic device is in parallel to the horizontal plane. In this case, when the sensing result of the sensing module 904 is 90 degree, the judging module 905 judges that the sensing result represents that the electronic device is in the first state. When the sensing result of the sensing module 904 is 0 degree, the judging module 905 judges that the sensing result represents that the electronic device is in the second state. In addition, optionally, when the sensing result of the sensing module 904 is a value between 90 degree and 0 degree, the judging module 905 judges that the sensing result represents that the electronic device is switching from the first state to the second state or from the second state to the first state.

Also, as described above, the first state may be a state in which the angle between the display module of the electronic device and the horizontal plane is within a first range. The first range is for example from 30 degree to 90 degree. The second state may be a state in which the angle between the display module of the electronic device and the horizontal plane is within a second range. The second range is for example from 0 degree to 30 degree. In this case, when the sensing result of the sensing module 904 is for example 70 degree, the judging module 905 judges that the sensing result represents that electronic device is in the first state. When the sensing result of the sensing module 904 is for example 20 degree, the judging module 905 judges that the sensing result represents that the electronic device is in the second state. Also, optionally, when the sensing result of the sensing module 904 is 30 degree, the judging module 905 judges that the sensing result represents that the electronic device is switching from the first state to the second state or from the second state to the first state.

Moreover, as described above, the first state may be a state in which the user of the electronic device grasps the electronic device in a first posture, and the second state may be a state in which the user of the electronic device grasps the electronic device in a second posture. In this case, when the sensing result of the sensing module 904 is that the contact point is near the two long sides of the electronic device (for example when the user grasps the electronic device by a single hand), or when the sensing result of the sensing module 904 is that the contact point is at the predetermined position of the electronic device (for example, when the user locates the electronic device at the in-car dock), the judging module 905 judges that the sensing result represents that electronic device is in the first state. When the sensing result of the sensing module 904 is that the contact point is near the two short sides of the electronic device (for example when the user grasps the electronic device by two hands), the judging module 905 judges that the sensing result represents that electronic device is in the second state.

When the sensing result of the sensing module 904 represents that the electronic device is in the first state, the judging module 905 controls the display module 903 to display the real-view image as shown in FIG. 8*a*. When the sensing result of the sensing module 904 represents that the electronic device is in the second state, the judging module 905 controls the display module 903 to display the real-view image as shown in FIG. 8*b*.

Thereby, when it is sensed that the user puts the electronic device in a nearly vertical or vertical state (for example, when the angle between the display module of the electronic device and the horizontal plane is within a range from 30 degree to 90 degree), or it is sensed that the user grasps the electronic device in a first posture (for example, when the user grasps the electronic device by a single hand or when the user locates the electronic device at the in-car dock), the display module of the electronic device displays the real-view image. When it is sensed that the user puts the electronic device in a nearly horizontal or horizontal state (for example, when the angle between the display module of the electronic device and the horizontal plane is within a range from 0 degree to 30 degree), or it is sensed that the user grasps the electronic device in a second posture (for example, when the user grasps the electronic device by two hands), the display module of the electronic device displays the map image, whereby free switching between the real-view image and the map image is achieved without additional keys.

The switching way is consistent with the cognitive habit of the user, and fully utilizes the properties of the real-view image and the map image. In particular, when the electronic device is in a nearly horizontal or horizontal state, most part of the real-view image displayed on the display module of the electronic device is the ground or the sky, and is not closely related to the scenario. Thereby, when the electronic device is in a nearly horizontal or horizontal state, it is suitable for displaying the map image. On the other hand, when the electronic device is in a vertical state, it can achieve the best effect by displaying the real-view image.

Thereby, with the electronic device according to the embodiment of the disclosure, the real-view image and the map image can be switched automatically according to the state of the electronic device without additional keys, to ease the user operation and improve the user experience while saving the resource of the electronic device.

In addition, optionally, the electronic device may further comprise a third obtaining module for obtaining location information of the electronic device. The third obtaining module is for example a GPS module.

The electronic device may further comprise a map image center determining module for determines the center of the map image according to the location information of the electronic device obtained by the third obtaining module. That is, the map image center determining module sets the point corresponding to the location where the electronic device locates in as the center of the map image. Of course, the electronic device may not need to set the point corresponding to the location where the electronic device locates in as the center of the map image, but rather to set the point corresponding to the location where the electronic device locates in as any predetermined location of the map image, for example, the bottom center point of the map image. When the electronic device is used for navigation, such arrangement is often more suitable.

Moreover, the electronic device comprises a first scale determining module for determining the scale of the map image based on the size of the display module. If the scale is too large, the region that can be displayed by the map image is limited, and it is not suitable for navigation. For example, in the case of FIG. 8*b*, the user is currently at location point A, if the scale is too large to display the full path from point B to C, the region displayed by the map image is too small, and the user cannot fully use the map image for navigation. If the scale is too small, the map image cannot be displayed clearly and even cannot show the path from point B to C, which is also not suitable for navigation. Therefore, the first scale determining module needs to determine the scale of the map image considering the size of the display module and the watching effect. The method for determining the scale of the map image is known to those skilled in the art, and will not be described here in detail.

The third obtaining module is connected to the map image center determining module. The third obtaining module, the map image center determining module and the first scale determining module are connected to the control module. When the map image is controlled to be displayed, the control module controls the display module to display the map image based on the center determined by the map image center determining module and the scale of the map image determined by the first scale determining module. Thereby, the obtained real-view image and the map image to be displayed are related to each other. In particular, the real-view image and the map image are related through the location information. That is, the map image to be displayed is obtained based on the location information when obtaining the real-view image.

Moreover, the electronic device may also comprise: an information entry acquiring module connected with the third obtaining module and the server, for acquiring information entries in a predetermined distance from the electronic device, based on the location information of the electronic device; a first information entry determining module connected with the information entry acquiring module, for determining the first information entry matching with the real-view image from the information entries; and a first superimposing module connected with the first information entry determining module, for superimposing the first information entry on the real-view image.

Thereby, the information entry related to the location information of the electronic device may be displayed in the real-view image. In particular, the information entry acquiring module acquires information entries in a predetermined distance from the electronic device based on the location information of the electronic device. That is, the information entry acquiring module acquires all information entries in a circular region with a center of the location of the electronic device, and a radius of a predetermined distance. The predetermined distance may be specified by the user or determined by the server by default. The information entry may be a point related to the object in the real-view image or the map image. The information on the information entry may include the location information, the property information, the comment information, etc.

Moreover, the electronic device further comprises an orientation module such as an electronic compass for determining the direction to which the electronic device faces by the compass module. The first information entry determining module is connected to the compass module, and determines a first information entry matching with the real-view image from the information entries based on the direction to which the electronic device faces determined by the compass module. In particular, among all information entries in the circular region obtained as described above, the first information entry determining module determines the information entry contained in the real-view image obtained by the camera module of the electronic device, i.e., the first information entry displayed on the real-view image, based on the direction to which the electronic device faces and the view field information of the camera module itself. Thereby, the first information entry determining module determines the first information entry matching with the real-view image.

Then, the first superimposing module superimposes the first information entry with the real-view image, and displays it, then obtains the real-view image as shown in FIG. 8a.

Optionally, the horizontal coordinate of the location of the information entry superimposed with the real-view image may be determined, based on the compass information of the electronic device and the view field information of the camera module and the location information of the information entry, when superimposing the first information entry with the real-view image. If the information entry comprises height information, the vertical coordinate of the location of the information entry superimposing with the real-view image may also be determined based on the height information, thereby superimposing the first information entry at the corresponding location of the real-view image. In the obtained real-view image, the information entry is superimposed at the corresponding location of the real-view image, thereby the user may know the real-view image as well as the detailed location of the information entry of interest in the real-view image better and conveniently, and the user experience is greatly improved.

Also, the electronic device may comprise:
a second information entry determining module for determining second information entry corresponding to the first information entry in the map image based on the first information entry;
a second scale determining module for determining the scale of the map image in a way suitable for the display of the second information entry based on the size of the display module, when displaying the map image; and
a second superimposing module for superimposing the second information entry on the map image.

When displaying the map image, the second information entry determining module determines a second information entry corresponding to the first information entry in the map image based on the first information entry. The second information entry may be the same as the first information entry, or alternatively may be a part of the first information entry, or alternatively may contain the first information entry.

In addition, the second scale determining module determines the scale of the map image in a way suitable for the display of the second information entry based on the size of the display module. Similarly, the scale needs to be suitable for navigation by the user using the map image.

Then, the second superimposing module superimposes the second information entry with the map image. The first superimposing module may be the same as the second superimposing module, or alternatively may be different. The first scale determining module and the second scale determining module may be the same, or alternatively may be different.

In particular, the electronic device may display the map image in the following way. For example, when the display is switched from the real-view image to the map image, the electronic device arranges the point of the location where the user currently locates in to the predetermined location of the display module, for example the bottom center part, and displays the map image according to the fixed original scale. Then, the electronic device obtains the current information entry on the current map image, and performs a first comparison with the first information entry.

If the number of the current information entries is less than that of the first information entries, the electronic device maintains the point corresponding to the location where the user currently locates in as it is, and enlarges the scale, and then continues the first comparison.

When the number of the current information entries is not less than that of the first information entries, the electronic device determines the information entry nearest to the edge of the display module from the current information entry, computes the distance from the information entry to the screen edge, and performs the second comparison between the distance and the predetermined threshold. When the distance is shorter than the predetermined threshold, the electronic device maintains the point corresponding to the location where the user currently locates in as it is, and decreases the scale. When the distance is longer than the predetermined threshold, the electronic device maintains the point corresponding to the location where the user currently locates in as it is, and enlarges the scale. When the distance is equal to the predetermined threshold, the electronic device obtains the map image based on the current scale as the final map image to be displayed. Thereby, the second information entries in the map image comprises all the first information entries in the real-view image, and are displayed in a scale suitable for the watching by the user, thereby it is convenient for the user operation, and improves the user experience.

The second information entry may be displayed independent of the map image, for example, displayed at the predetermined position at the lower part of the display module. Optionally, the second information entry may be displayed by superimposing with the map image. At this time, the second information entry is superimposed at the corresponding position of the map image based on the location information of the second information entry. Thereby, the user may watch the map image conveniently by superimposing the second information entry and displaying the map image with a proper scale by the electronic device, and the user may know the relationship between the information entry of interest and the location where the user locates in, so that the user experience is greatly improved.

Moreover, to enrich the display effect and improve the user experience, when the sensing result represents that the electronic device is switching from the first state to the second state or from the second state to the first state, a transition image may be displayed on the display module, which is shown in FIG. 8c as an example. In particular, when the electronic device is switched from the first state to the second state, the image on the display module is controlled to be switched from the real-view image to the transition image, and then from the transition image to the map image. When the real-view image and the map image contain the information entry, the information entry is moved upwards from its position on the real-view image. A predetermined picture of a 3D ground will be presented gradually on the display module, and the information entries will gradually move to the corresponding position on the 3D ground. Then, the 3D ground gradually becomes transparent and disappears, and the map image is displayed. The change when the electronic device is switched from the second state to the first state is opposite to this change, and will not be described here in detail. It is to be noted that, those skilled in the art can understand that the implementation of the transition image and the moving manner of the information entry are not limited to the above particular implementation.

The electronic device according to the embodiment of the present disclosure has been described above. With the electronic device according to the embodiment of the present disclosure, the real-view image and the map image may be switched according to the state of the electronic device in a way consistent with the user habits, without additional buttons. Thereby, it is convenient to operate and the user experience is improved while the resource of the electronic device is saved.

The electronic device and the display method thereof according to the embodiment of the present disclosure have been described above with reference to FIGS. 7-9.

The electronic device and the display method thereof according to the embodiment of the present disclosure are applicable to the navigation application for example. For example, when the user holds the electronic device vertically by hand, the real-view image is obtained by the first obtaining module of the electronic device. When the user puts the electronic device horizontally, the electronic device will display a map image related to the real-view image. For another example, when the user puts the electronic device to a fixed in-car dock with a first posture (e.g., vertically), the real-view image is obtained by the first obtaining module of the electronic device. When the user puts the electronic device to the fixed in-car dock with a second posture (e.g., horizontally), the electronic device will display a map image related to the real-view image. Thereby, the real-view image and the map image may be switched automatically without additional buttons, it is convenient for the user and the user experience is improved. Moreover, when the real-view image and the map image comprise the information entry, the electronic device and the display method thereof according to the embodiment of the present disclosure may be useful for the user to know the surroundings better by the real-view image, and to view the whole scenario conveniently by the map image when necessary.

In the following, the electronic device and the file saving method according to another embodiment of the present disclosure will be described with reference to FIGS. 10-14.

Figure 10:
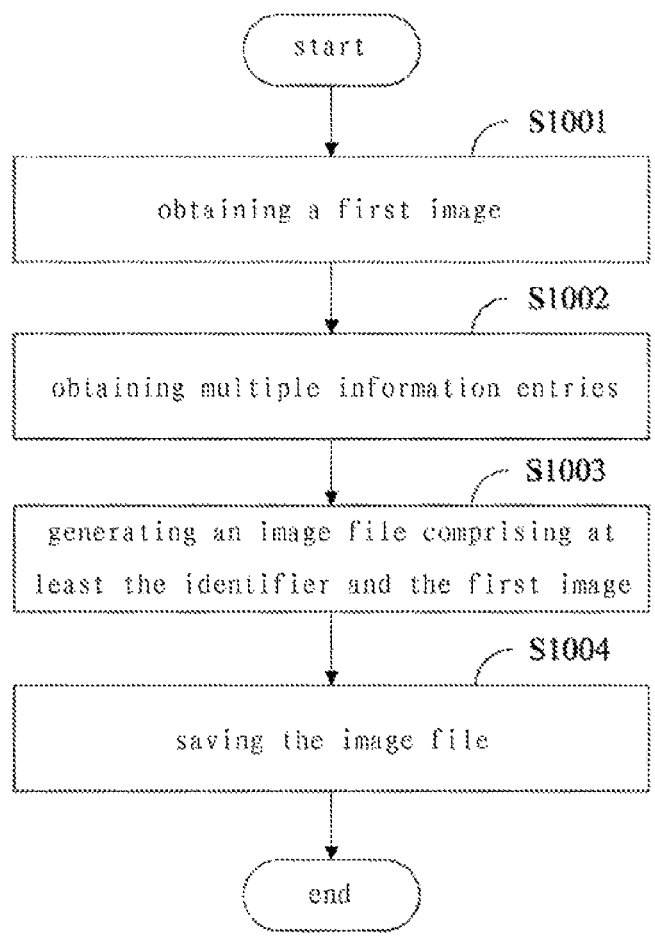
FIG. 10 is a flowchart showing a file saving method according to an embodiment of the present disclosure.

FIG. 10 is a flowchart showing the file saving method according to the embodiment of the present disclosure. As shown in FIG. 10, the file saving method comprises:

step S1001: obtaining a first image comprising multiple objects.

In the file saving method according to the embodiment of the present disclosure, the electronic device comprises for example a camera module. The file saving method obtains the first image by for example the camera module. Alternatively, the electronic device may not comprise the camera module, and obtain the first image from the internal memory or from outside through network. The first image is for example a real-view image. Of course, the first image may be other images. Moreover, the first image comprises multiple objects which may have a one-to-one correspondence to the real objects. That is, the so-called object may refer to the object comprised in the first image which corresponds to the real object, i.e., the real-view object. Of course, those skilled in the art can understand that the multiple objects are not required to correspond to the real objects one by one.

step S1002: obtaining multiple information entries;

In various location-based services, the information entry is often used, which is a combination of various information corresponding to the real object and the real-view object. The information entry comprises for example the type of the real object, such as the restaurant, the hospital, the school, etc.; the geological location information of the real object; the name of the real object; the user comment; and so on. Moreover, the information entry may also be the link for acquiring various information corresponding to the real object and the real-view object.

The file saving method may obtain the information entry from the remote server for example. Of course, the file saving method may also obtain the information entry from the internal or external memory of the electronic device.

It is to be noted that, the first information entry of the multiple information entries corresponds to the first object of the multiple objects. In particular, the first information entry is at least a part of the multiple information entries. The first object is at least a part of the multiple objects. That is, among the obtained multiple information entries, at least a part of the information entry (i.e., the first information entry) corresponds to at least a part of the object (i.e., the first object) of the objects of the first image obtained in step S1001. That is, in the obtained multiple information entries, there may be an information entry that does not correspond to any one of the objects in the first image obtained in step S1001. In addition, the first identifier is a mark or a sign for identifying the first information entry in the first image. That is, the first information entry corresponds to the first identifier. Therefore, there is a one-to-one correspondence among the first information entry, the first identifier and the first object.

Step S1003: generating an image file comprising at least the first identifier and the first image.

At step S1003, the file saving method generates the image file by using the first image and the first identifier corresponding to the first information entry of the multiple information entries, after obtaining the first image at step S1001 and obtaining multiple information entries at step S1002, so that the generated image file comprises at least the first identifier and the first image. It is to be noted that the file saving method may also use an identifier corresponding to an information entry other than the obtained first information entry, so that the generated image file also comprises the identifier corresponding to the information entry other than the obtained first information entry, in addition to the first identifier and the first image.

Step S1004: saving the image file.

After generating the image file at step S1003, the file saving method saves the image file in the internal or external memory, or may save the image file at the remote server through network for later use.

For example, the first image and the first identifier may be displayed when the image file is opened, after the image file has been saved. At this time, when an operation targeted at the first identifier is received, the first information entry corresponding to the first identifier is displayed. For example, when the first information entry is the type of the real object, the type of the real object corresponding to the first identifier will be displayed when an operation targeted at the first identifier is received. When the first information entry is a link for acquiring information related to the real object, the link will be displayed when an operation targeted at the first identifier is received. At this time, if a click operation on the link by the user is received, the file saving method will access to the address corresponding to the link through network, obtain information related to the real object, and present it to the user.

Thereby, with the file saving method according to the embodiment of the present disclosure, the first image and multiple information entries are obtained, and the image file comprising at least the first identifier and the first image is generated and saved, wherein the first information entry of the multiple information entries corresponds to the first object of the multiple objects, and the first information entry corresponds to the first identifier. With the generated image file comprising the information entry identifier and the image, when using the image file for navigation in a near distance, the displayed image and the scenario where the user locates in correspond to each other, so that it is convenient for the user to navigate intuitively using the image file, and acquire information related to the real object in and out of the scenario, and the user experience is improved.

The file saving method according to the embodiment of the present disclosure will be described in more detail with reference to FIG. 11.

Figure 11:
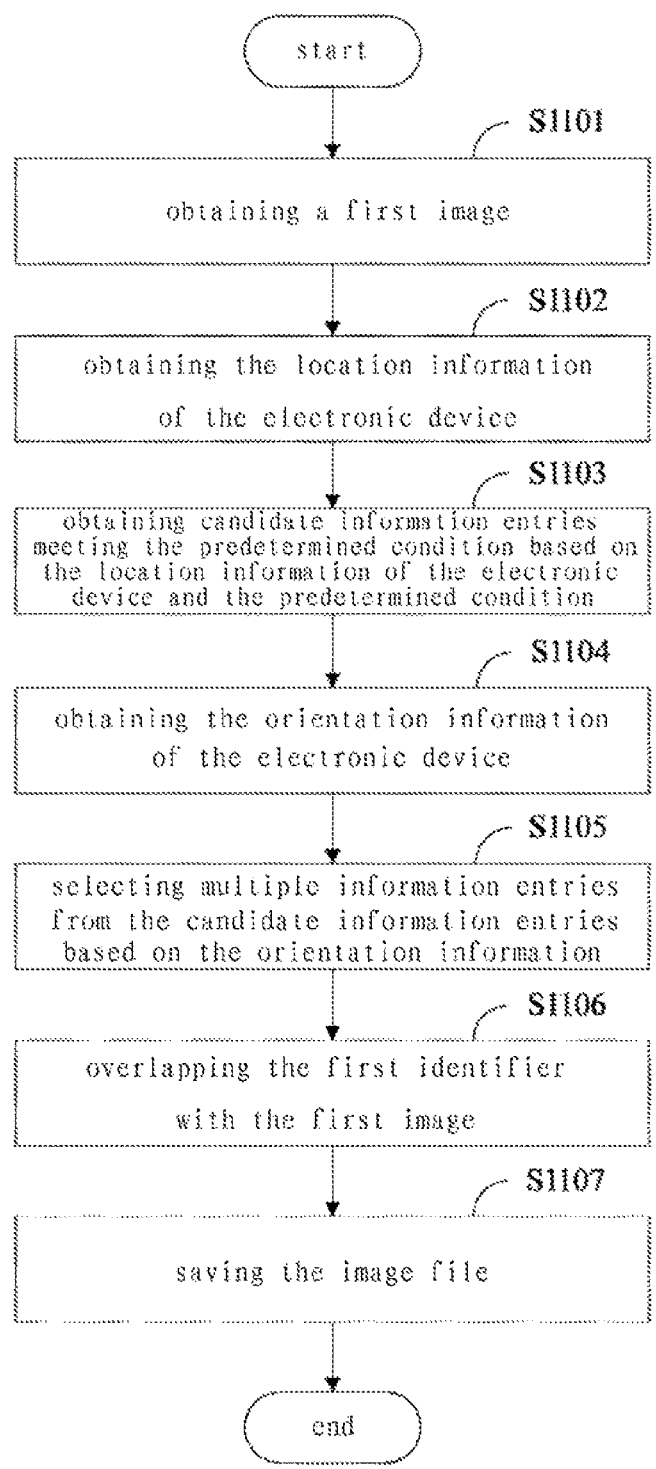
FIG. 11 is a flowchart illustrating the file saving method according to an embodiment of the present disclosure in more detail.

FIG. 11 is a flowchart showing the file saving method according to the embodiment of the present disclosure in more detail. As shown in FIG. 11, the file saving method comprises:

step S1101: obtaining the first image.

The operation of step S1101 is similar to the operation of step S1001 in the flowchart of FIG. 10, and is not described here in detail.

Step S1102: obtaining the location information of the electronic device.

For example, the electronic device may comprise a GPS module for location. The file saving method may obtain the location information of the electronic device. The location information is for example the latitude and longitude of the electronic device.

Step S1103: obtaining candidate information entries meeting the predetermined condition based on the location information of the electronic device and the predetermined condition.

For example, the file saving method transmits the location information of the electronic device and the predetermined condition (for example, 2 km) to the remote server. The remote server determines candidate information entries to be transmitted to the electronic device from the database, based on the location information of the electronic device and the predetermined condition. As described above, the information entry comprises information items such as the name of the real object corresponding to the information entry, the location information, the type, the comment etc. Then, the file saving method receives the candidate information entries transmitted from the remote server. The candidate information entries obtained at this time are information entries corresponding to all real objects that meet the predetermined condition (for example, with a predetermined distance from the electronic device).

Step S1104: obtaining the orientation information of the electronic device.

For example, the electronic device may comprise an electronic compass module for location. The file saving method may comprise the orientation information of the electronic device by the electronic compass module for example. The orientation information is for example the angle between the direction to which the electronic device faces and the north direction.

Step S1105: selecting multiple information entries from the candidate information entries based on the orientation information of the electronic device.

Since the camera module of the electronic device has a certain view angle, and the electronic device faces to a certain direction, in the image obtained by the camera module, not all the real-view objects corresponding to all the real objects are included. Therefore, the file saving method needs to select the final information entry from the candidate information entries based on the orientation information of the electronic device and the view angle of the camera module.

It is to be noted that the operations of steps S1102-S1105 correspond to the operation of step S1002 in the flowchart of FIG. 10. Also, the steps S1101-S1105 do not need to be performed in the order as shown in the flowcharts, but rather, can be performed in any proper order when necessary. For example, step S1101, step S1102 and step S1104 may be performed in any time order or in parallel to each other. Moreover, as described above, the first information entry of the obtained multiple information entries corresponds to the first object of the multiple objects, and the first information entry corresponds to the first identifier.

Step S1106: generating the image file by superimposing the first identifier on the first image.

In particular, in the file saving method according to the embodiment of the present disclosure, the first information entry comprises the location information of the corresponding real object. The file saving method computes the distance from the real object to the electronic device, based on the location information of the real object and the location information of the electronic device. The detailed computing method is known to those skilled in the art, and will not be described here in detail.

Then, the file saving method classifies the first identifiers into the identifier of the first type and the identifier of the second type based on the distance. For example, the real object corresponding to the identifier of the first type is relatively close to the electronic device. The real object corresponding to the identifier of the second type is relatively remote to the electronic device. In particular, the file saving method presets a threshold for example 1 km. When the distance from the real object corresponding to the first identifier to the electronic device is less than the threshold, it is judged that the first identifier belongs to the identifier of the first type. When the distance from the real object corresponding to the first identifier to the electronic device is more than or equal to the threshold, it is judged that the first identifier belongs to the identifier of the second type.

Of course, the file saving method may also classify the first identifier into one type of multiple types of the information entry. For example, the first identifier may also comprise the identifier of the third type. The real object corresponding to the identifier of the third type is of a middle distance from the electronic device. In this case, the file saving method presets more than one threshold, for example, a first threshold of 0.5 km and a second threshold of 1.5 km. When the distance from the real object corresponding to the first identifier to the electronic device is less than the first threshold, it is judged that the first identifier belongs to the identifier of the first type. When the distance from the real object corresponding to the first identifier to the electronic device is more than or equal to the second threshold, it is judged that the first identifier belongs to the identifier of the second type. When the distance from the real object corresponding to the first identifier to the electronic device is more than the first threshold but less than the second threshold, it is judged that the first identifier belongs to the identifier of the third type.

Then, the file saving method superimposes the identifier of the first type in the first region of the first image by a first display effect, and superimposes the identifier of the second type in the second region of the first image by a second display effect. The first region and the second region may not overlap with each other. For example, the first region is at the lower part of the display region, and the second region is at the upper part of the display region. Alternatively, the first region and the second region may overlap with each other at least partially. In this case, the area of the first region is larger than that of the second region. That is, the second region may be contained in the first region. In addition, the first display effect and the second display effect may be different, and may be distinguished by the display ratio, the color, the transparency, etc. For example, the identifier of the first type is displayed with a larger size by the first display effect, and the identifier of the second type is displayed with a smaller size by the second display effect. For another example, the identifier of the first type is displayed non-transparently by the first display effect, and the identifier of the second type is displayed translucently by the second display effect. Alternatively, the first display effect and the second display effect may be the same.

In addition, optionally, the angle between the line from the electronic device to the real object and the direction to which the electronic device faces may also be computed based on the location information of the electronic device, the location information of the real object and the orientation information of the electronic device. Then, it is determined whether the identifier of the first type and the identifier of the second type should be displayed in the left side or the right side of the first image, based on the computed angle, so that the fusion of the mark of the information entry and the real-view image merge becomes better.

Of course, the file saving method may not superimpose the first identifier on any particular position of the first image, but superimpose the first identifier at any position of the first image.

Step S1107: saving the image file. The operation is similar to the operation of step S1004 in the flowchart of FIG. 10, and is not described here in detail.

It is to be noted that the image file is generated by the operation of step S1106. The image file comprises at least the first identifier and the first image. Then, the first image and the first identifier are displayed when the image file is opened. When an operation targeted at the first identifier is received, the first information entry corresponding to the first identifier is obtained locally or remotely through the network, and the first information entry is displayed.

Alternatively, the image file may also be generated by combining the first image superimposed with the first identifier and the first information entry at step S1106. That is, in this case, the generated image file comprises the first identifier, the first information entry corresponding to the first identifier and the first image. Thereby, the first image and the first identifier are displayed when the image file is opened. When an operation targeted at the first identifier is received, the first information entry corresponding to the first identifier contained in the image file itself is obtained and displayed.

Then, with the file saving method according to the embodiment of the present disclosure, the first image and multiple information entries are obtained, and the image file comprising at least the first identifier and the first image is generated and saved, wherein the first information entry of the multiple information entries corresponds to the first object of the multiple objects, and the first information entry corresponds to the first identifier. With the generated image file comprising the information entry identifier and the image, when using the image file for navigation in a near distance, the displayed image and the scenario where the user locates in correspond to each other, so that it is convenient for the user to navigate intuitively using the image file, and acquire information related to the real object in and out of the scenario, and the user experience is improved.

In addition, with the file saving method according to the embodiment of the present disclosure, the identifier of the first type among the first identifier may be superimposed in the first region of the first image, and the identifier of the second type among the first identifier may be superimposed in the second region of the first image. Thereby, the identifier is superimposed in different regions of the first image according to the different properties of the real object corresponding to the first identifier. For example, when the real object corresponding to the first identifier belongs to the object in a near distance, the first identifier is superimposed and displayed in the first region of the first image. When the real object corresponding to the first identifier belongs to the object in a remote distance, the first identifier is superimposed and displayed in the second region of the first image. By superimposing different marks (identifiers) in different regions, compared with the technology in which the marks are not displayed by region, the display of the mark meets the perspective principle of human eye better, and the case in which the identifiers are displayed superimposing with each other when there are multiple marks is avoided as much as possible. Thereby, the fusion of the mark and the image becomes better, and the user experience is improved further.

In the following, the file saving method according to another embodiment of the present disclosure will be described with reference to FIG. 12.

Figure 12:
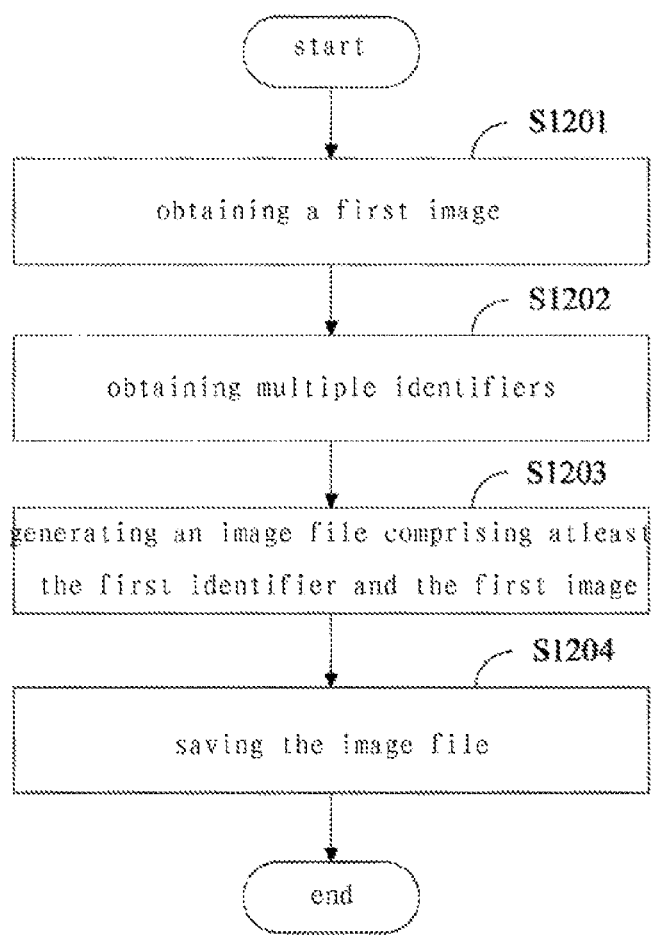
FIG. 12 is a flowchart showing a file saving method according to another embodiment of the present disclosure.

FIG. 12 is a flowchart of the file saving method according to another embodiment of the present disclosure. As shown in FIG. 12, the file saving method comprises:

step S1201: obtaining a first image comprising multiple objects;

The operation of step S1201 is similar to that of step S1001 in the flowchart of FIG. 10, and is not described here in detail.

Step S1202: obtaining multiple identifiers.

Different from step S1001, in the embodiment of the present disclosure, what is obtained is not the information entry, but the identifier. The file saving method may obtain the multiple identifiers from the internal or external memory locally, or obtain the multiple identifiers from the remote server through network.

The first identifier of the multiple identifiers corresponds to the first object of the multiple objects. In particular, the first identifier is at least a part of the multiple identifiers. The first object is at least a part of the multiple objects. That is, among the obtained multiple objects, at least a part of the identifier (i.e., the first identifier) corresponds to at least a part of the object (i.e., the first object) of the first image obtained at step S1201. In other words, among the obtained multiple identifiers, there may be an identifier that does not correspond to any object in the first image obtained at step S1001. In addition, the first identifier is a mark or a sign for obtaining the first information entry, for example a mark of a circular, triangular or other shape. The first information entry is used to indicate information on the first object corresponding to the first identifier. That is, there is a one-to-one correspondence among the first information entry, the first identifier and the first object.

Step S1203: generating an image file comprising at least the first identifier and the first image.

Step S1204: saving the image file.

The operations of steps S1203 and S1204 are similar to those of steps S1003 and S1004 in the flowchart of FIG. 10, and are not described here in detail.

When the image file has been generated and saved as described above, if the file saving method detects that the image file is opened, the first image and the first identifier are displayed. When an operation targeted at the first identifier is received, the file saving method may obtain the first information entry corresponding to the first identifier from the internal or external memory of the electronic device, or obtain the first information entry from the remote server through network. Alternatively, the image file may also comprise the first information entry corresponding to the first identifier, in addition to the first identifier and the first image. In this case, when an operation targeted at the first identifier is received, the file saving method may obtain the first information entry from the image file itself. Then, the file saving method displays the first information entry corresponding to the first identifier.

With the file saving method according to the embodiment of the present disclosure, the first image and multiple information entries are obtained, and the image file comprising at least the first identifier and the first image is generated and saved, wherein the first information entry of the multiple information entries corresponds to the first object of the multiple objects, the first information entry corresponds to the first identifier. With the generated image file comprising the information entry identifier and the image, when using the image file for navigation in a near distance, the displayed image and the scenario where the user locates in corresponds to each other, so that it is convenient for the user to navigate intuitively using the image file, and acquire information related to the real object in the scenario, and the user experience is improved.

In the following, the electronic device according to the embodiment of the present disclosure will be described with reference to FIGS. 13 and 14.

Figure 13:
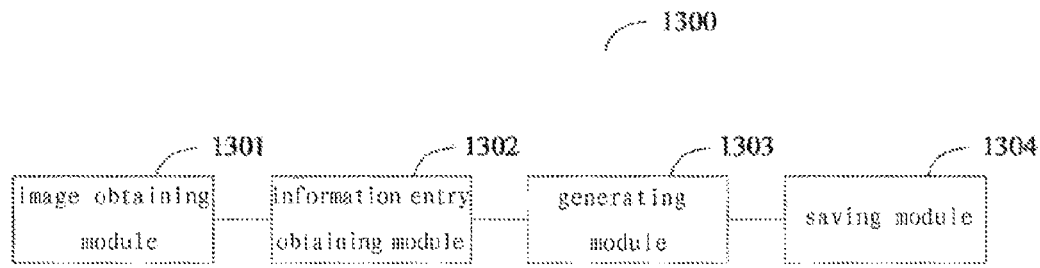
FIG. 13 is a block diagram showing the main configuration of an electronic device according to another embodiment of the present disclosure.

FIG. 13 is a flowchart showing the main configuration of the electronic device 1300 according to the embodiment of the present disclosure.

As shown in FIG. 13, the electronic device 1300 comprises:

an image obtaining module 1301 for obtaining the first image comprising multiple objects;

an information entry obtaining module 1302 for obtaining multiple information entries, wherein the first information entry of the multiple information entries corresponds to the first object of the multiple objects, and the first information entry corresponds to the first identifier;

a generating module 1303 for generating an image file comprising at least the first identifier and the first image; and a saving module 1304 for saving the image file.

The image obtaining module 1301 is for example a camera module. The electronic device 1300 obtains the first image by for example the camera module. Alternatively, the electronic device 1300 may not comprise the camera module, and obtain the first image from the internal memory or from outside through network. The first image is for example a real-view image. Of course, the first image may be other images. Moreover, the first image comprises multiple objects.

The information entry obtaining module 1302 may obtain the information entry from the remote server for example. Of course, the information entry obtaining module 1302 may also obtain the information entry from the internal or external memory of the electronic device.

The generating module 1303 generates the image file by using the first image and the first identifier corresponding to the first information entry of the multiple information entries, so that the generated image file comprises at least the first identifier and the first image. It is to be noted that the generating module 1303 may also use an identifier corresponding to an information entry other than the obtained first information entry, so that the generated image file also comprises the identifier corresponding to the information entry other than the obtained first information entry, in addition to the first identifier and the first image.

The saving module 1304 saves the image file in the internal or external memory, or may save the image file at the remote server through network for later use.

Moreover, the electronic device may comprise: a display module (not shown) for displaying the first image and the first identifier when the image file is opened; and a receiving module (not shown) for receiving an operation targeted at the first identifier. At this time, when the receiving module receives the operation targeted at the first identifier, the display module displays the first information entry corresponding to the first identifier. For example, when the first information entry is the type of the real object, when the receiving module receives the operation targeted at the first identifier, the display module displays the type of the real object corresponding to the first identifier. When the first information entry is a link for acquiring information related to the real object, when the receiving module receives the operation targeted at the first identifier, the display module displays the link. At this time, if the receiving module receives the operation targeted at the first identifier, the electronic device accesses the address corresponding to the link through network, obtains information related to the real object, and presents it to the user by the display module.

Thereby, with the electronic device according to the embodiment of the present disclosure, the first image and multiple information entries are obtained, and the image file comprising at least the first identifier and the first image is generated and saved, wherein the first information entry of the multiple information entries corresponds to the first object of the multiple objects, and the first information entry corresponds to the first identifier. With the generated image file comprising the information entry identifier and the image, when using the image file for navigation in a near distance, the displayed image and the scenario where the user locates in corresponds to each other, so that it is convenient for the user to navigate intuitively using the image file, and acquire information related to the real object in the scenario, and the user experience is improved.

It is to be noted that in the electronic device 1300 described above, the information entry obtaining module obtains multiple information entries. Alternatively, the electronic device according to another embodiment of the present disclosure may use an identifier obtaining module instead of the information entry obtaining module. The identifier obtaining module may obtain the multiple identifiers from the internal or external memory locally, or may obtain the multiple identifiers from the remote server through network.

When the image file has been generated and saved as described above, if the electronic device detects that the image file is opened, the first image and the first identifier are displayed. When an operation targeted at the first identifier is received, the electronic device may obtain the first information entry corresponding to the first identifier from the internal or external memory of the electronic device. Alternatively, the image file contains the first information entry corresponding to the first identifier in addition to the first identifier and the first image. In this case, when an operation targeted at the first identifier is received the electronic device may obtain the first information entry from the image file itself. Then, the electronic device displays the first information entry corresponding to the first identifier by the display module.

The configuration and operation of the electronic device according to the embodiment of the present disclosure will be described in more detail with reference to FIG. 14.

Figure 14:
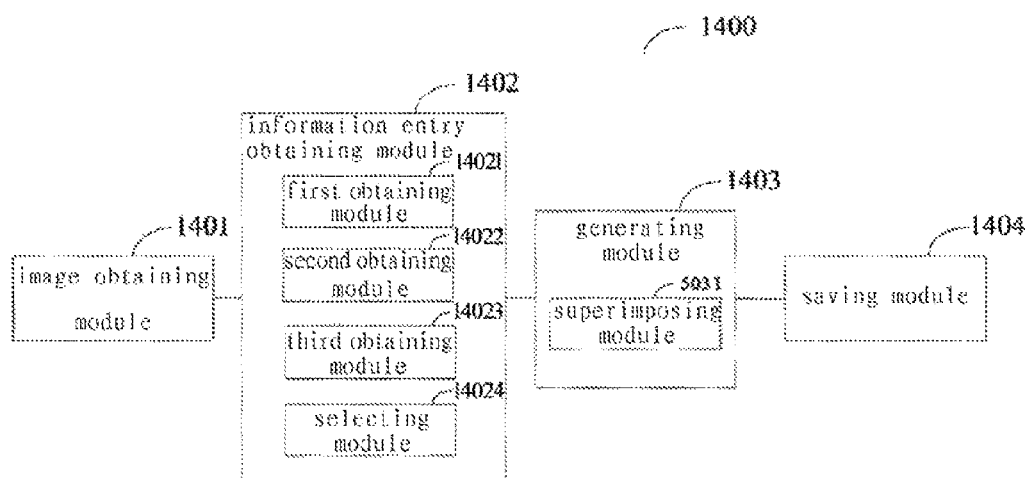
FIG. 14 is a block diagram illustrating the main configuration of an electronic device according to an embodiment of the present disclosure in more detail.

FIG. 14 is a block diagram showing the main configuration of the electronic device according to the embodiment of the present disclosure.

As shown in FIG. 14, the electronic device 1400 according to the embodiment of the present disclosure comprise: an image obtaining module 1401, an information entry obtaining module 1402, a generating module 1403 and a saving module 1404. The configuration and operation of the image obtaining module 1401 and the saving module 1404 are similar to those of the image obtaining module 1301 and the saving module 1304 in the block diagram of FIG. 13, and are not described here in detail.

In the block diagram of FIG. 14, the configuration of the information entry obtaining module 1402 and the generating module 1403 are shown in more detail.

In particular, the information entry obtaining module 1402 comprises:

a first obtaining module 14021 for obtaining the location information of the electronic device;

a second obtaining module 14022 for obtaining candidate information entries meeting the predetermined condition based on the location information of the electronic device and the predetermined condition;

a third obtaining module 14023 for obtaining the orientation information of the electronic device; and a selecting module 14024 for selecting multiple information entries from the candidate information entries based on the orientation information of the electronic device.

The first obtaining module 14021 is for example a GPS module for location. The electronic device 1400 may obtain the location information of the electronic device by the GPS module. The location information is for example the latitude and longitude of the electronic device.

The second obtaining module 14022 transmits the location information of the electronic device and the predetermined condition (for example, 2 km) to the remote server. The remote server determines candidate information entries to be transmitted to the electronic device from the database, based on the location information of the electronic device and the predetermined condition. As described above, the information entry comprises information items such as the name of the real object corresponding to the information entry, the location information, the type, the comment etc. Then, the second obtaining module 14022 receives the candidate information entries transmitted from the remote server. The candidate information entries obtained at this time are information entries corresponding to all real objects that meet the predetermined condition (for example, with a predetermined distance from the electronic device).

The third obtaining module 14023 may be an electronic compass module for location. The electronic device 1400 may obtain the orientation information of the electronic device by the electronic compass module for example. The orientation information is for example the angle between the direction to which the electronic device faces and the north direction.

Since the camera module of the electronic device has a certain view angle, and the electronic device faces to a certain direction, in the image obtained by the camera module, not all the real-view objects corresponding to all the real objects are included. Therefore, the electronic device 1400 needs to select the final information entry from the candidate information entries based on the orientation information of the electronic device and the view angle of the camera module. Of course, the electronic device 1400 may also obtain the multiple information entries from its internal or external memory.

The generating module 1403 comprises: a superimposing module 14031 for superimposing the first identifier on the first image to generate the image file.

The superimposing module 14031 may further comprise: a computing module (not shown) for computing the distance from the real object to the electronic device, based on the location information of the real object and the location information of the electronic device;

a classifying module (not shown) connected to the computing module for classifying the first identifier into the identifier of the first type and the identifier of the second type based on the distance;

a first region superimposing module (not shown) connected to the classifying module for superimposing the identifier of the first type in the first region of the first image; and a second region superimposing module (not shown) connected to the classifying module for superimposing the identifier of the second type in the second region of the first image.

In particular, the first information entry comprises the location information of the corresponding real object. The computing module computes the distance from the real object to the electronic device, based on the location information of the real object and the location information of the electronic device. The detailed computing method is known to those skilled in the art, and will not be described here in detail.

Then, the classifying module classifies the first identifiers into the identifier of the first type and the identifier of the second type. For example, the real object corresponding to the identifier of the first type is relatively close to the electronic device. The real object corresponding to the identifier of the second type is relatively remote to the electronic device. In particular, the classifying module presets a threshold for example 1 km. When the distance from the real object corresponding to the first identifier to the electronic device is less than the threshold, it is judged that the first identifier belongs to the identifier of the first type. When the distance from the real object corresponding to the first identifier to the electronic device is more than or equal to the threshold, it is judged that the first identifier belongs to the identifier of the second type.

Of course, the classifying module may also classify the first identifier into one type of multiple types of the information entry. For example, the first identifier may also comprise the identifier of the third type. The real object corresponding to the identifier of the third type is of a middle distance from the electronic device. In this case, the file saving method presets more than one threshold, for example, a first threshold of 0.5 km and a second threshold of 1.5 km. When the distance from the real object corresponding to the first identifier to the electronic device is less than the first threshold, it is judged that the first identifier belongs to the identifier of the first type. When the distance from the real object corresponding to the first identifier to the electronic device is more than or equal to the second threshold, it is judged that the first identifier belongs to the identifier of the second type. When the distance from the real object corresponding to the first identifier to the electronic device is more than the first threshold but less than the second threshold, it is judged that the first identifier belongs to the identifier of the third type.

Then, the first region superimposing module superimposes the identifier of the first type in the first region of the first image by a first display effect. The second region superimposing module superimposes the identifier of the second type in the second region of the first image by a second display effect. In addition, optionally, the computing module may also compute the angle between the line from the electronic device to the real object and the direction to which the electronic device faces, based on the location information of the electronic device, the location information of the real object and the orientation information of the electronic device. Then, the classifying module determines whether the identifier of the first type and the identifier of the second type should be displayed in the left side or the right side of the first image, based on the computed angle, so that the fusion of the mark of the information entry and the real-view image becomes better.

Of course, the superimposing module may not superimpose the first identifier on any particular position of the first image, but superimpose the first identifier at any position of the first image.

It is to be noted that the image file saved by the saving module 1404 comprises at least the first identifier and the first image. Then, when the image file is opened, the display module displays the first image and the first identifier. When the receiving module receives the operation targeted at the first identifier, the first information entry corresponding to the first identifier is obtained locally or remotely through network, and is displayed.

Alternatively, the generating module 1403 may also comprise a combining module (not shown) connected to the superimposing module 14031, for combining the first image superimposed with the first identifier with the first information entry to generate the image file. That is to say, in this case, the generated image file comprises the first identifier, the first information entry corresponding to the first identifier and the first image. Thereby, when the image file is opened, the display module displays the first image and the first identifier. When the receiving module receives the operation targeted at the first identifier, the first information entry corresponding to the first identifier contained in the image file is obtained, and is displayed by the display module.

Then, with the electronic device according to the embodiment of the present disclosure, the first image and multiple information entries are obtained, and the image file comprising at least the first identifier and the first image is generated and saved, wherein the first information entry of the multiple information entries corresponds to the first object of the multiple objects, and the first information entry corresponds to the first identifier. With the generated image file comprising the information entry identifier and the image, when using the image file for navigation in a near distance, the displayed image and the scenario where the user locates in correspond to each other, so that it is convenient for the user to navigate intuitively using the image file, and acquire information related to the real object in the scenario, and the user experience is improved.

In addition, with the electronic device according to the embodiment of the present disclosure, the identifier of the first type among the first identifier may be superimposed in the first region of the first image, and the identifier of the second type among the first identifier may be superimposed in the second region of the first image. Thereby, the identifier is superimposed in different regions of the first image according to the different properties of the real object corresponding to the first identifier. For example, when the real object corresponding to the first identifier belongs to the object in a near distance, the first identifier is superimposed and displayed in the first region of the first image. When the real object corresponding to the first identifier belongs to the object in a remote distance, the first identifier is superimposed and displayed in the second region of the first image. By superimposing different marks in different regions, compared with the technology in which the marks are not displayed by region, the display of the mark meets the perspective principle of human eye better, and the case in which the identifiers are displayed superimposing with each other when there are multiple marks is avoided as much as possible. Thereby, the fusion of the mark and the image merge becomes better, and the user experience is improved further.

The electronic device, the display method and the file saving method according to the embodiment of the present disclosure have been described above with reference to the figures.

According to the embodiment of the present disclosure, a display method applied in an electronic device is provided, the electronic device is in a first state and has a display area, the display method comprising: obtaining an image; obtaining information entries; displaying the image in the display area; and displaying a first type of the information entry among the information entries, in a first region of the display area by a first identifier with a first display effect, and displaying a second type of the information entry among the information entries, in a second region of the display area by a second identifier with a second display effect; wherein the first type of the information entry is different from the second type of the information entry.

The information entry corresponds to an object, and the information entry corresponds to an identifier. The display method further comprises: generating an image file comprising at least the identifier and the image; and saving the image file.

The first region at least partially overlaps with the second region, and the area of the first region is larger than that of the second region.

The second region and the first region are controlled to move when the electronic device switches from the first state to the second state; and the first identifier is controlled to move in a direction in the first region, and the second identifier is controlled to move in the direction in the second region, based on the moving direction of the second region and the first region.

The step of obtaining information entries comprises: obtaining location information of the electronic device; obtaining orientation information of the electronic device; and obtaining the information entry and the location information of the information entry, based on the location information and the orientation information of the electronic device.

The display method further comprises: computing the distance from the electronic device to a real object corresponding to the information entry, based on the location information of the electronic device and the location information of the information entry; and judging whether the information entry belongs to the first type of the information entry or the second type of the information entry, based on the distance.

According to another embodiment of the present disclosure, an electronic device in a first state is provided, comprising: an image obtaining module for obtaining an image; an information entry obtaining module for obtaining information entries; a display module for displaying the image in a display area thereof; and a controlling module for controlling to display a first type of the information entry among the information entries, in a first region of the display area by a first identifier with a first display effect, and to display a second type of the information entry among the information entries, in a second region of the display area by a second identifier with a second display effect; wherein the first type of the information entry is different from the second type of the information entry.

The information entry corresponds to an object, and the information entry corresponds to an identifier. The electronic device further comprises: a generating module for generating an image file comprising at least the identifier and the image; and a saving module for saving the image file.

The electronic device further comprises: a first judging module for judging whether the information entry belongs to the first type of the information entry or the second type of the information entry; or a computing module for computing a distance from the electronic device to a real object corresponding to the information entry, based on a location information of the electronic device and a location information of the information entry; and a second judging module for judging whether the information entry belongs to the first type of the information entry or the second type of the information entry, based on the distance.

According to another embodiment of the present disclosure, a display method applied in an electronic device is provided, the electronic device has a first obtaining module for obtaining a real-view image; a second obtaining module for obtaining a map image; and a display module; the electronic device has a first state and a second state; wherein, the spatial location of the electronic device in the first state is different from that in the second state; the display method comprising: sensing the current state of the electronic device to generate a sensing result; judging whether the sensing result represents that the electronic device is in the first state or in the second state; and controlling the display module to display the real-view image when the sensing result represents that the electronic device is in the first state; controlling the display module to display the map image when the sensing result represents that the electronic device is in the second state.

The display method further comprises: obtaining location information of the electronic device; wherein, the step of controlling the display module to display the map image comprises: determining the center of the map image based on the location information of the electronic device; determining the scale of the map image based on the size of the display module; and controlling the display module to display the map image based on the determined center and scale of the map image.

The display method further comprises: obtaining the location information of the electronic device; acquiring information entries in a predetermined distance from the electronic device, based on the location information of the electronic device; determining a first information entry matching with the real-view image from the information entries; and superimposing the first information entry on the real-view image.

The display method further comprises: determining a second information entry corresponding to the first information entry in the map image based on the first information entry; determining the scale of the map image in a way suitable for the display of the second information entry based on the size of the display module, when displaying the map image; and superimposing the second information entry on the map image.

The electronic device is in a first state and has a display area, the display method further comprises: obtaining the information entries; displaying the real-view image in the display area; and displaying a first type of the information entry among the information entries, in a first region of the display area by a first identifier with a first display effect, and displaying a second type of the information entry among the information entries, in a second region of the display area by a second identifier with a second display effect; wherein the first type of the information entry is different from the second type of the information entry.

The information entry corresponds to an object, and the information entry corresponds to an identifier; the display method further comprises: generating an image file comprising at least the identifier and the image; and saving the image file.

According to another embodiment of the present disclosure, an electronic device having a first state and a second state is provided, wherein the spatial location of the electronic device in the first state is different from that in the second state, the electronic device comprising: a first obtaining module for obtaining a real-view image; a second obtaining module for obtaining a map image of a location where the electronic device locates in; a display module for displaying the real-view image or the map image; a sensing module for sensing the current state of the electronic device to generate a sensing result; a judging module for judging whether the sensing result represents that the electronic device is in the first state or in the second state; and a controlling module for controlling the display module to display the real-view image when the sensing result represents that the electronic device is in the first state; controlling the display module to display the map image when the sensing result represents that the electronic device is in the second state.

The electronic device further comprises: a third obtaining module for obtaining the location information of the electronic device; a map image center determining module for determining the center of the map image based on the location information of the electronic device; and a first scale determining module for determining the scale of the map image based on the size of the display module; and, the controlling module controls the display module to display the map image based on the determined center and scale of the map image when controlling to display the map image.

The electronic device further comprises: a third obtaining module for obtaining the location information of the electronic device; an information entry acquiring module for acquiring information entries in a predetermined distance from the electronic device, based on the location information of the electronic device; a first information entry determining module for determining a first information entry matching with the real-view image from the information entries; and a first superimposing module for superimposing the first information entry with the real-view image.

The electronic device further comprises: a second information entry determining module for determining a second information entry corresponding to the first information entry in the map image based on the first information entry; and a second superimposing module for determining the scale of the map image in a way suitable for the display of the second information entry based on the size of the display module, when displaying the map image; and a second superimposing module for superimposing the second information entry with the map image.

The electronic device is in a first state and has a display area, the electronic device further comprises: an information entry obtaining module for obtaining the information entries; a real-view image displaying module for displaying the real-view image in the display area; and an information entry displaying module for displaying a first type of the information entry among the information entries, in a first region of the display area by a first identifier with a first display effect, and displaying a second type of the information entry among the information entries, in a second region of the display area by a second identifier with a second display effect; wherein the first type of the information entry is different from the second type of the information entry.

The information entry corresponds to an object, and the information entry corresponds to an identifier; the electronic device further comprises: an image file generating module for generating an image file comprising at least the identifier and the image; and a saving module for saving the image file.

It should be noted that, in this specification, the terms "comprising", "including" or any other variant are intended to cover a non-exclusive inclusion, so that the process, method, article or device comprising a series of elements comprises not only those elements, but also comprises other elements not expressly listed, or further comprises elements inherent in this process, method, article, or device. In the case of no more restrictions, the elements defined by the statement "comprises a . . . ", do not preclude the existence of additional identical elements in the process, method, article or device comprising the elements.

Finally, it should be noted that, the above-described series of processes comprise not only the processes performed in time series in the order described herein, but also comprise the processes performed concurrently or separately, instead of in chronological order.

Through the above description of the embodiments, the skilled in the art can clearly understand that the present invention can be implemented by means of software plus a necessary hardware platform; certainly, it can also be implemented entirely by hardware. Based on such understanding, all or part of the contribution of the technical solution of the present invention to the background art, may be embodied in the form of a software product, which can be stored in a storage medium, such as a ROM/RAM, hard disk, optical disk, etc., comprising a plurality of instructions for allowing a computer device (which may be a personal computer, a server, or a network device, etc.) to perform the methods described in various embodiments or in some portion of the embodiments of the present invention.

The above has described the present invention in detail, and specific examples are used herein to explain the principles and embodiments of the invention. However, the above description of the embodiments is only used to help understanding the methods and core ideas of the present invention; meanwhile, for the ordinary skilled in the art, based on the ideas of the invention, variations can be made both in implementations and application ranges; in summary, the content of this specification should not be understood as limitative to the present invention.

What is claimed is:

1. A display method applied in an electronic device, the electronic device is in a first state and has a display area, the display method comprising:
   obtaining a real-view image;
   obtaining information entries;
   displaying the real-view image in the display area; and
   displaying a first type of information entry among the information entries, in a first region of the display area by a first identifier with a first display effect, and displaying a second type of information entry among the information entries, in a second region of the display area by a second identifier with a second display effect, so that the display of the real-view image and the information entries are merged and meet a vision theory of human being;
   wherein the first type of the information entry is different from the second type of the information entry,
   a real object corresponding to the first type of the information entry is an object close to the electronic device,
   a real object corresponding to the second type of the information entry is an object away from the electronic device; and the first region is in the lower part of the display region, and the second region lies in the upper part of the display region when the first region and the second region are not overlapped with each other, and an area of the first region is larger than that of the second region when the second region is included in the first region.

2. The display method of claim 1, wherein,
the information entry corresponds to an object, and the information entry corresponds to an identifier;
the display method further comprises:
  generating an image file comprising at least the identifier and the real-view image; and
  saving the image file.

3. The display method of claim 1, wherein,
the first region at least partially overlaps with the second region, and the area of the first region is larger than that of the second region.

4. The display method of claim 1, further comprising:
controlling the second region and the first region to both move in a moving direction when the electronic device is switched from the first state to the second state; and
controlling the first identifier to move in a direction in the first region based on the moving direction of the second region and the first region, and controlling the second identifier to move, in the second region, in the same direction as the first identifier.

5. The display method of claim 1, wherein, the step of obtaining information entries comprises:
  obtaining location information of the electronic device;
  obtaining orientation information of the electronic device; and
  obtaining the information entries and the location information of the information entries, based on the location information and the orientation information of the electronic device;
the display method further comprises:
  for each information entry, computing distance from the electronic device to a real object corresponding to the information entry, based on the location information of the electronic device and the location information of the information entry; and
  judging whether the information entry belongs to the first type of the information entry or the second type of the information entry, based on the distance.

* * * * *